US005105225A

United States Patent [19]

Honjo et al.

[11] Patent Number: 5,105,225

[45] Date of Patent: Apr. 14, 1992

[54] IMAGE FORMING APPARATUS WITH INCREASED THROUGHPUT FROM SIMULTANEOUS SCANNING AND ORIGINAL FEED

[75] Inventors: Takeshi Honjo, Kawasaki; Noriyoshi Ueda, Yokohama; Akimaro Yoshida, Tokyo; Hideki Adachi, Kawasaki; Toshiya Kanazawa, Kawasaki; Satoshi Kaneko, Kawasaki, all of Japan

[73] Assignee: Canon Kabushiki Kaisha, Tokyo, Japan

[21] Appl. No.: 481,105

[22] Filed: Feb. 16, 1990

[51] Int. Cl.[5] .................... G03G 15/04; G03B 27/50

[52] U.S. Cl. .................... 355/233; 355/235; 355/313; 355/50

[58] Field of Search .............. 355/235, 233, 243, 309, 355/311, 48-51, 66, 319, 313; 271/3.1

[56] References Cited

U.S. PATENT DOCUMENTS

| | | | |
|---|---|---|---|
| 3,914,044 | 10/1975 | Ogawa | 355/8 |
| 4,366,219 | 12/1982 | Beery | 355/235 |
| 4,459,010 | 7/1984 | Hinton et al. | 355/235 X |
| 4,544,148 | 10/1985 | Kitajima et al. | 271/3.1 |
| 4,564,288 | 1/1986 | Nonoue et al. | 355/57 |
| 4,627,709 | 12/1986 | Kitajima et al. | 355/14 SH |
| 4,667,951 | 5/1987 | Honjo et al. | 271/259 |
| 4,674,866 | 6/1987 | Tanaka | 271/3.1 X |
| 4,763,160 | 8/1988 | Honjo | 355/3 SH |
| 4,811,049 | 3/1989 | Honjo et al. | 355/14 SH |
| 4,817,933 | 4/1989 | Honjo et al. | 271/3.1 |
| 4,825,248 | 4/1989 | Honjo et al. | 355/14 SH |
| 4,864,366 | 9/1989 | Saeki | 355/235 |
| 4,881,729 | 11/1989 | Culligan et al. | 271/3.1 |
| 4,935,775 | 6/1990 | Ueda et al. | 355/202 |

FOREIGN PATENT DOCUMENTS

| | | |
|---|---|---|
| 58-148150 | 9/1983 | Japan . |
| 60-48854 | 3/1985 | Japan . |
| 60-140364 | 7/1985 | Japan . |
| 60-178441 | 9/1985 | Japan . |
| 61-32836 | 2/1986 | Japan . |

*Primary Examiner*—Joan H. Pendegrass

*Attorney, Agent, or Firm*—Fitzpatrick, Cella, Harper & Scinto

[57] ABSTRACT

An image reading apparatus has an automatic original transporting device, a scanning device for effecting exposure scanning of the original while moving relative to the original over a platen glass, and a control circuit for controlling the scanning device to cause it to effect exposure scanning while moving it in a direction opposite to the direction in which the original is being transported. An image forming apparatus which includes the above image reading apparatus is also provided.

36 Claims, 29 Drawing Sheets

| FIG. 9A-1 |
| --- |
| FIG. 9A-2 |

| FIG. 18A |
|---|
| FIG. 18B |

IMAGE FORMING APPARATUS WITH INCREASED THROUGHPUT FROM SIMULTANEOUS SCANNING AND ORIGINAL FEED

BACKGROUND OF THE INVENTION

1. Field of the Invention

The present invention relates to an image reading apparatus, such as a copying machine, a printer or a laser beam printer, provided with original feeding means for automatically feeding an original to an original platen, and to an image forming apparatus provided with such an image reading apparatus.

2. Related Background Art

Conventional methods of feeding an original by means of a sheet-material transporting device and reading an image therefrom by means of an image forming apparatus such as a copying machine are divided into two major types. One method comprises the steps of exposing and reading a sheet original upon halting it at a predetermined position on a glass platen, while moving an optical system, and the other method comprises the steps of exposing and reading a sheet original by means of an optical system fixed in position, while transporting sheet originals one after another.

The former method is utilized in a recurrence type of original transporting apparatus disclosed in Japanese Patent Laid-Open No. 58-148150. This apparatus is disposed on the top of the main body of a copying machine, and sheet originals are stacked on a tray with their processing surfaces facing up. One sheet original is sequentially separated from the original stack at the lowermost position thereof at a time and transported onto a platen glass disposed on the main body of the copying machine. After the sheet original has been halted in a predetermined position, only an optical system is moved to expose the sheet original. After completion of the exposure, the sheet original is discharged from the original platen. After the leading edge of the original is securely captured by the first grip rollers on the downstream side, the next original is transported onto the platen glass. Replacement of originals on the platen glass is accomplished by the operation of causing the successive originals to pass each other.

However, this conventional arrangement has a number of disadvantages. For example, replacement of originals is performed by the operation of causing the exposed original and the next original to pass each other. Accordingly, transport of the next original cannot be performed before the leading edge of the exposed original is securely gripped by the first transporting means on the downstream side. As a result, the time required for the leading edge of the original to be securely gripped after the completion of the exposure is needed for the replacement of the originals in spite of a lost time. This makes it difficult to improve throughput to a great extent.

A conventional arrangement utilizing the latter method is disclosed in Japanese Patent Laid-Open Nos. 60-140364 and 61-32836. In this arrangement, a continuous copying operation is achieved by sequentially transporting a sheet original to an exposure position, halting the sheet original at a predetermined position, moving an optical system alone, replacing the original with the next original immediately after reading has reached the trailing edge of the original, and simultaneously returning the optical system to its home position. The continuous copying operation leads to the improved throughput of the copying machine. However, the above method has the following disadvantage. The distance traveled by the next original from the leading edge of the halt position to the reading start position need be made equal to the length of the original plus the distance between successive originals. As a result, original replacement requires a long time and the throughput of the copying machine deteriorates.

The aforesaid method has a critical problem. Since the same portion is continuously illuminated by the illumination lamp of the optical system, the temperature of the platen glass or the original transporting device disposed thereon increases. In particular, an arrangement of a high-throughput type requires a high intensity lamp, and the amount of heat increases.

In order to solve the above problem, Japanese Patent Laid-Open No. 60-178441 discloses a method in which each time a predetermined number of originals are exposed, the halt position of an optical system is shifted. This method, however, still has a number of problems. For example, each time the halt position of the optical system is shifted, the read start position of the leading edge of the original varies. Accordingly, a complicated control method for positioning is required. The time required for the optical system to move to a different halt position is consumed as a lost time, thus leading to a decrease in throughput.

This method has further problems. For example, if the throughput of the method is to be improved to a further extent, it is also possible to adopt a method of reducing the time of image reading merely by increasing the moving speed of the original. In such method, since a sheet original is held by the friction of belts, rollers or the like, as the moving speed increases, the amount of slip or variation in the speed of rotation of a motor may increase. As a result, an image may be blurred and a satisfactory image cannot be obtained. If these problems are to be improved, a motor or a driving system having torque or inertia greater than would be otherwise unnecessary must be prepared, so that the cost and size of the apparatus will increase.

SUMMARY OF THE INVENTION

It is therefore an object of the present invention to provide an improved image reading apparatus and an improved image forming apparatus provided with such image reading apparatus.

It is another object of the present invention to provide an image reading apparatus capable of improving throughput by means of a simple arrangement and an image forming apparatus provided with such image reading apparatus.

It is another object of the present invention to provide an image reading apparatus capable of realizing a low cost and compact arrangement but of minimizing the formation of imperfect images, and an image forming apparatus provided with such image reading apparatus.

It is another object of the present invention to provide an image reading apparatus which involves no excessive temperature rise and which enables easy control of scanning of scanning means, and an image forming apparatus provided with such image reading apparatus.

It is another object of the present invention to provide an image reading apparatus in which the relative reading speed is increased without the need to increase the moving speed of an original by executing reading while causing the original and a scanning means to pass each other, and to provide an image forming apparatus provided with such image reading apparatus.

It is another object of the present invention to provide an image reading apparatus in which the throughput of a multicopy operation can be improved and an image forming apparatus provided with such image reading apparatus.

It is another object of the present invention to provide an image reading apparatus which effects a multicopy operation by performing reading while causing an original and a scanning means to pass each other, then refeeding the original after the completion of the reading, and then repeating a similar reading operation, and to provide an image forming apparatus provided with such image reading apparatus.

It is another object of the present invention to provide an image reading apparatus which performs reading while causing an original and a scanning means to pass each other and whose throughput is improved by rendering the reversing position of a scanning means variable, and to provide an image forming apparatus provided with such image reading apparatus.

In accordance with these objects there is provided an image reading apparatus comprising original transporting means for automatically transporting a plurality of originals one by one onto an original platen; scanning means for effecting exposure scanning of the original while moving relative to said original which is being transported over said original platen by said original transporting means; and controlling means for controlling said scanning means so as to cause said scanning means to effect exposure scanning while moving said scanning means in a direction opposite to the direction of original feed during the transport of said original by said original transporting means.

The above and other objects, features and advantages of the present invention will be apparent from the following description of preferred embodiments of the invention with reference to the accompanying drawings.

BRIEF DESCRIPTION OF THE DRAWINGS

FIGS. 4-1 to 4-4 are partial cross-sectional views showing the manner in which an original is fed;

FIGS. 8-1 to 8-4 are schematic views showing other embodiments of the present invention, respectively;

FIGS. 9A, 9A-1 and 9A-2 and 9B are flowcharts which serve to illustrate the operation of an arrangement in which the reversing position of the optical system is made variable;

DETAILED DESCRIPTION OF PREFERRED EMBODIMENTS

Embodiments of the present invention will be explained below with reference to the accompanying drawings.

Figure 1:
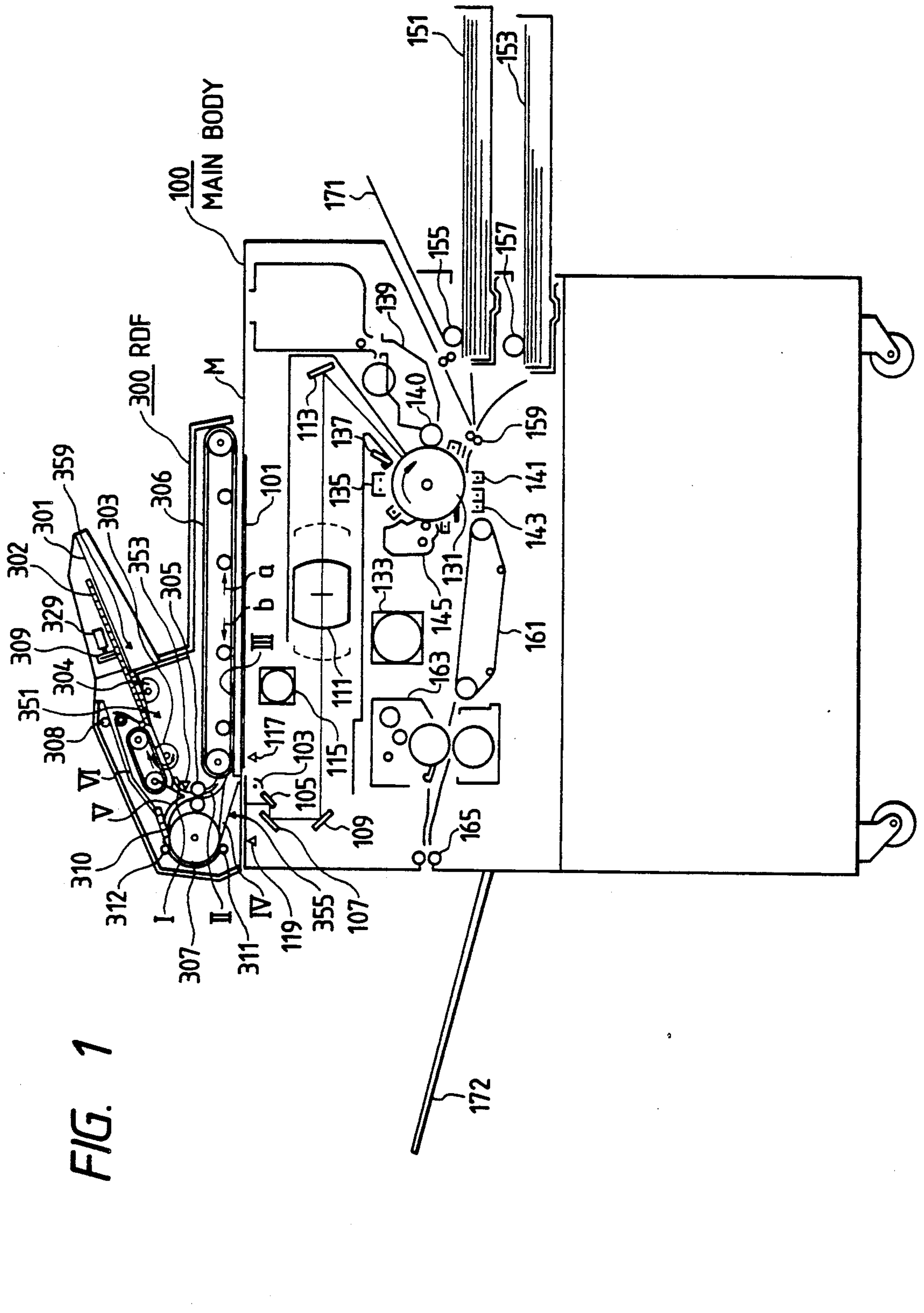
FIG. 1 is a partially omitted cross-sectional view showing the internal arrangement of an image forming apparatus to which one embodiment of the present invention is applied.

FIG. 1 is a partially omitted cross-sectional view showing the internal arrangement of an image forming apparatus to which one embodiment of the present invention is applied. In the drawing, the main body of a copying machine having an image reading function and an image recording function is indicated generally at 100, and a recurrence type of document original feeder (hereinafter referred to as a "RDF") is indicated generally at 300.

A. MAIN BODY 100

The main body 100 comprises the following major elements: an original support glass on which an original is placed; an illumination lamp (exposure lamp) 103 for illuminating an original; first to third scanning reflection mirrors (scanning mirrors) 105, 107 and 109 for changing the optical path of light reflected from the original; a lens 111 having the functions of effecting focusing and changing magnifications; and a fourth reflection mirror (scanning mirror) 113 for changing the optical path of the reflected light. The main body 100 also comprises an optical system motor 115 for actuating an optical system, and sensors 117 and 119 for sensing the position of the optical system.

The main body 100 also comprises a photosensitive drum 131, a main motor 133 for actuating the photosensitive drum 131, a high voltage unit 135, a blank exposure unit 137, a developing unit 139, a developing roller 140, a transfer charger 141, a separating charger 143, and a cleaning device 145.

The main body 100 further comprises an upper stage casette 151, a lower stage casette !53, a manual feed port 171, paper feed rollers 115 and 157, and a registration roller 159. A carriage belt 161 transports recording paper on which an image is recorded, and a fixing unit 163 fixes a toner image on the received recording paper by the application of heat and pressure.

The surface of the photosensitive drum 131 is made from a seamless photosensitive member employing a photoconductive member and an electrical conductor. The drum 131, which is supported for rotation about its axis, is actuated to rotate in the direction of the arced arrow shown thereon in FIG. 1 by the motion of the main motor 133 which is actuated in response to the operation of pressing a copy start key which will be explained later. Then, when predetermined rotation control and potential control processing (preprocessing) for the drum 131 have been completed, the original placed on the original platen glass 101 is illuminated by the illumination lamp 103 integral with the first scanning mirror 105, and light reflected from the original is focused on the photosensitive drum 131 over the optical path formed by the first scanning mirror 105, the second scanning mirror 107, the third scanning mirror 109, the lens 111, and the fourth scanning mirror 113.

The photosensitive drum 131 is corona-discharged by the high voltage unit 135. Thereafter, the photosensitive drum 131 is slit-exposed to the image (original image) illuminated by the illumination lamp 103, and an electrostatic latent image is formed on the drum 131 by a known Carlson method.

Then, the electrostatic latent image on the photosensitive drum 131 is developed by the developing roller 140 of the developing unit 139 so that it is formed as a visible toner image. The toner image is transferred to transfer paper by means of the transfer charger as will be explained later.

More specifically, either the transfer paper set in the upper stage casette 151 or the lower stage casette 153 or the transfer paper set in the manual feed port 171 is fed into the main body 100 by the paper feed roller 155 or 157, and is then fed toward the photosensitive drum 131 at an accurate timing by the registration roller 159, whereby the tip of the latent image is made coincident with the leading edge of the transfer paper. Thereafter, the toner image is transferred from the photosensitive drum 131 to the transfer paper by passing the transfer paper through the gap between the transfer charger 141 and the photosensitive drum 131. After the transfer step has been completed, the transfer paper is separated from the photosensitive drum 131 by the separating charger 143 and conducted into the fixing unit 163 by the carriage belt 161. In the fixing unit 163. the transferred image is fixed by the application of pressure and heat. The fixed paper is then discharged out of the main body 100 and stacked on a discharge tray 172.

After the transfer, the photosensitive drum 131 continues rotating, whereby its surface is cleaned by the cleaning device 145 made up of a cleaning roller and an elastic blade.

B. RDF (RECURRENCE TYPE OF ORIGINAL DOCUMENT FEEDER) 300

Figure 2:
FIGS. 2, 2A and 2B is a block diagram showing the control section of the image forming apparatus shown in FIG. 1.
Figure 2A:
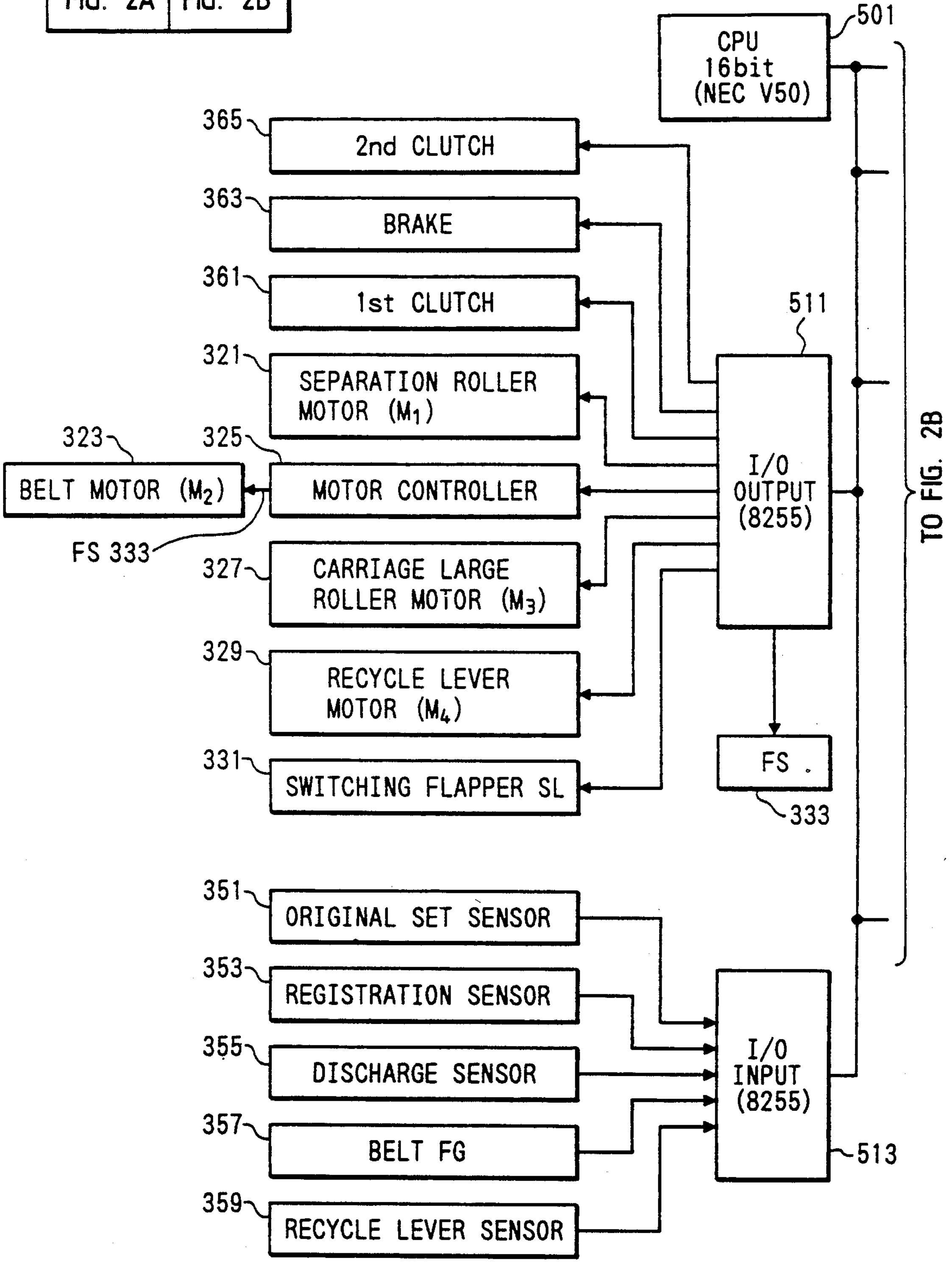
Figure 2B:
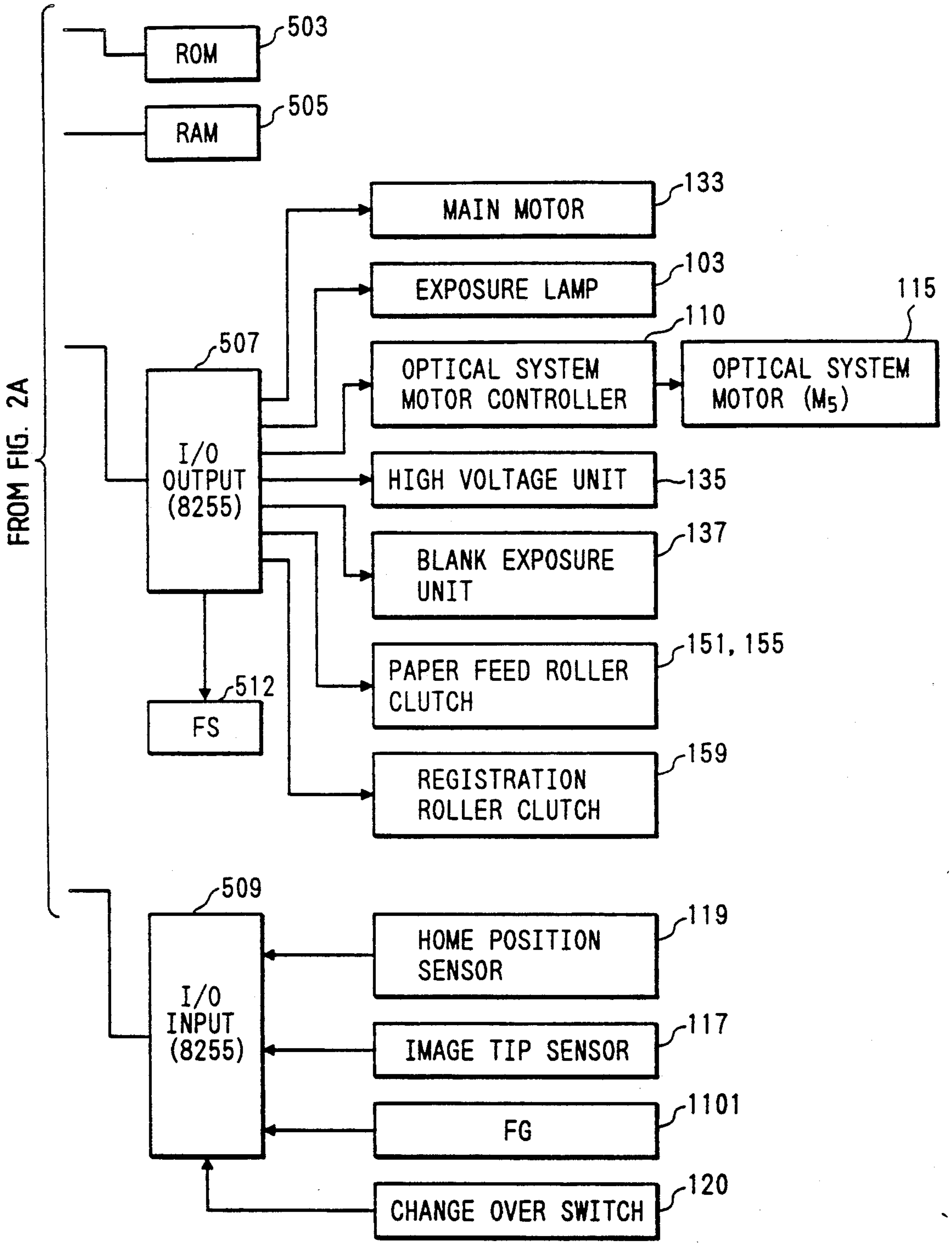

In the RDF 300, a bundle 302 of originals is set on a stacking tray 301. The original bundle 302 set on the stacking tray 301 is sensed by an original set sensor 351. If the original bundle 302 is a bundle of one-sided originals, the RDF 300 operates as follows. The originals are separated from the original bundle 302 at the lowermost power thereof in a one-by-one fashion by means of a semicircular roller 304 and a separating roller 303, which are actuated by a separating roller motor 321. The original thus separated is transported to a predetermined position on the platen glass 101 along paths I and II by means of a carriage roller 305 and a flat-face belt 306 both of which are actuated by a belt motor 323. When a predetermined time passes after the original has been sensed by a registration sensor 353 positioned midway in the path I, the transport of the original is stopped and a copy operating is started. The original is fed into paths IV and V over a path III by a carriage large roller 307 which is actuated by a carriage large roller motor 327 (FIG. 2). After the original has been sensed by a discharge sensor 355 positioned in the path IV, it is returned to the top of the original bundle 302 by means of a discharge roller 308. Carriage rollers 311 and 312 are disposed around the outer periphery of the carriage large roller 307 so that they individually press the carriage large roller 307 to assure the required transporting force. The transporting force created by the carriage large roller 307 and the carriage roller 311 is selected to be greater than that of the flat-face belt 306. Accordingly, during an original discharge operation, when the leading edge of the original is captured by the carriage large roller 307 and the carriage roller 311, it is possible to reliably remove the original from the platen glass 101 even if the flat-face belt 306 stops or reverses. A recycle lever 309 senses one cycle of original feeding by means of a sensor 359. During an original feed start, the recycle lever 309 is rotated and placed on the top of the original bundle by means of the motor 329. The originals are fed one-by-one and, when the trailing edge of the final original passes by the recycle lever 309, the recycle lever 309 falls by its own weight, thereby making it possible to sense the completion of one cycle of original feeding operation.

If the original bundle 302 is a bundle of double-sided originals, the RDF 300 operates as follows. The original is likewise conducted into the path III over the paths I and II. Then, a rotatable switching flapper 310 is switched by a solenoid SL 331 (FIG. 2) to conduct the leading edge of the original into the path IV. The original is then passed through the path II by the carriage roller 305, transported to the platen glass 101 by the flat-face belt 306, and stopped in position. In other words, the carriage large roller 307 and the route formed by the paths III-IV-II cooperate to reverse the original.

In addition, since the originals are one-by-one fed from the original bundle 302 over the paths I-II-III until the recycle lever 309 senses the completion of one cycle of original feeding operation, the number of originals can be automatically counted.

FIG. 2 shows in block form the circuit arrangement of a control device 500 in the embodiment of FIG. 1.

In FIG. 2, a central processing unit (CPU) 501 performs arithmetic control for controlling the operation of the copying machine and, for example, a microcomputer V50 manufactured by NEC (Nippon Electric Co., Ltd.) may be utilized. A read-only memory (ROM) 503 stored control procedures (control program), and the CPU 510 controls individual elements connected thereof via buses in accordance with the control procedures stored in the ROM 503. A random access memory (RAM) 505 constitutes a main memory for use as an input-data storing area or a working memory area.

An interface (I/O) 507 outputs the control signal supplied from the CPU 501 to a predetermined load, such as the main motor 133. The interface (I/O) 507 also serves to output a speed data signal, a rotational direction signal or the like to a motor controller 110 which controls the optical system motor 115. An interface 509 receives a signal output from an image tip sensor 117 or the like and transfers it to the CPU 501. An interface 511 outputs a control signal, supplied from the CPU 501, to a load such as a separating roller motor 321 of RDF or the like. An interface 513 receives a signal output from the registration sensor 353 of the RDF or another sensor. The interfaces 507, 509, 510 and 513 may utilize, for example, μPD8255 supplied by NEC.

Figure 3:
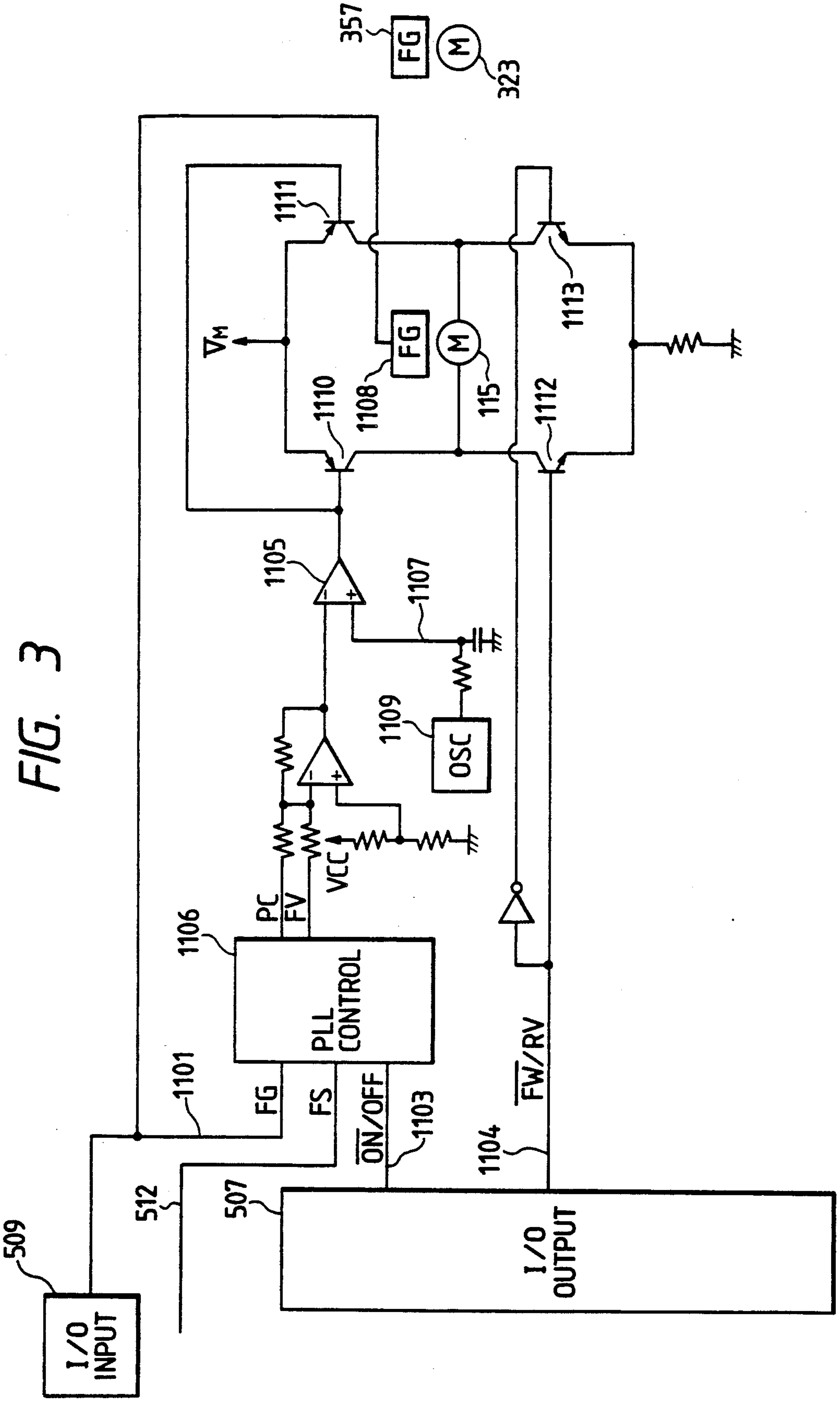
FIG. 3 is a circuit diagram showing the controller section of an optical system motor.

FIG. 3 is a circuit diagram showing a controller section 110 for the optical system motor 115. In FIG. 3, a PLL control section 1106 provides constant speed control over the optical system motor 115. As is known, the PLL control section 1106 compares a reference frequency FS 512 corresponding to the desired speed of revolution of the motor 115 with a signal FG 1101 which is output from an encoder 1108. The encoder 1108 electrically converts the speed of revolution of the motor 115 into the signal FG. The PLL control section 1106 detects the phase difference between them and outputs it as a motor drive signal. The signal FG 1101 is input to the interface 509.

A comparator 1105 compares the drive output from the PLL control section 1106 with a triangular wave 1107 obtained from an oscillator 1109, a resistor and a capacitor, and outputs a PWM (pulse width modulation)-controlled signal, thereby applying a drive voltage to the optical system motor 115. The reciprocal motion of the optical system by the optical system motor 115 is performed in the following manner. A $\overline{FW}$/RV signal 1104 is output from the I/O output section 507 of the main body control section. If the $\overline{FW}$/RV signal 1104 is at its low level, an electrical current is supplied to the optical system motor 115 through transistors 1110 and 1113. The motor 115 is thus actuated in the forward direction, thereby causing the optical system to move forwardly. If the $\overline{FW}$/RV signal 1104 is at its high level, an electrical current is supplied to the optical system motor 115 through transistors 1111 and 1112. The motor 115 is thus actuated in the reverse direction, thereby causing the optical system to move rearwardly.

Although the speed of revolution of the motor 115 is determined by the reference frequency FS 512, this reference frequency FS 512 is output from the CPU 501 which controls the present apparatus, and also the CPU 501 can select an arbitrary frequency. More specifically, as the reference frequency FS is increased, the motor speed increases so that the speed reciprocal movement of the optical system can be increased. In contrast, as the reference frequency FS is decreased, the motor speed decreases so that the speed of reciprocal movement of the optical system can be reduced. Accordingly, during a copying operation, the CPU 501 changes the reference frequency FS, as required, to change the speed of movement of the optical system, thereby reducing power dissipation.

A motor controller 325 of the RDF 300 may be constructed by using the arrangement of a similar PLL control and the optical system motor controller 110 of FIG. 3. Although no detailed explanation is given, the motor controller 325 can also select an arbitrary speed of revolution on the basis of a reference frequency FS 333. In addition, an encoder (belt FG) 357 electrically converts the speed of rotation of the belt in a signal. This signal is input to the interface 513 and supplied to the CPU 501. The driving force of the belt motor 323 is transmitted to the flat-face belt 306 and the carriage roller 305 through a first clutch 361 (refer to FIG. 2). In addition, the first clutch 361 (refer to FIG. 2). In addition, the first clutch 361 serves to separate the rotational force of the belt motor 323 from the driving force of the flat-face belt 306 and the carriage roller 305. A brake 363 (refer to FIG. 2) is connected to the flat-face belt 306 so that the flat-face belt 306 can be instantaneously stopped.

The carriage roller 305 includes a one-way clutch. Accordingly, during the reverse motion of the belt motor 323, no driving force is transmitted to the carriage roller 305, while the separating roller motor 321 (FIG. 2) and a clutch 365 (FIG. 2) cooperate to transmit driving force to the carriage roller 305. In this manner, the separating roller 303 and the carriage roller 305 can be actuated irrespective of the belt motor 323.

Copying operation employing the RDF of the image forming apparatus according to the present invention will be explained below with reference to FIGS. 4-1 to 4-4, which shows the operation of the RDF, and the flowchart of FIG. 5.

First of all, the operation of a single-oridinal-copy mode will be explained below. In response to a copy start command, the recycle lever motor 329 is activated to place the recycle lever 309 on the original bundle 302 placed on the stacking tray 301 (Step 1). The semicircular roller 304 and the separating roller 303 are rotated for a predetermined time to extract one original from the original bundle 302 at the lowermost position thereof. The leading end of the original is moved into contact with the carriage roller 305 so that the original is looped. This step prevents the sheet original from being fed obliquely (Step 2) (FIG. 4-1). Thereafter, the carriage roller 305 and the flat-face belt 306 are rotated (Step 3) to transport the original through the path 11 to a predetermined position γ on the platen glass 101. Although the transporting speed up to this point is set to a full speed, the original can be stopped with a high positional accuracy by engaging the first clutch 311 and by instantaneously energizing the brake 363. Then, the optical system motor 115 is turned on, and the first scanning mirror 105 starts to move in the direction of arrow A for scanning purposes. The first scanning mirror 105 moves at a speed SM under constant speed of the PLL control section. At the same time, the belt motor 323 is rotated in the reverse direction at a speed SB under constant speed of the PLL control section (Step 6). When the first scanning mirror 105 reaches the position where the home position sensor 119 is turned off (point β of FIG. 4-2), the belt brake 363 is energized and the first clutch 361 is engaged. Thus, the original whose leading edge is located at the position γ on the platen glass 101 is transported in the direction of arrow B (Step 7). In this manner, the first scanning mirror 105 and the original are moved in directions opposite to each other at predetermined speeds, respectively. When the first scanning mirror 105 reaches a position coincident with the leading edge of the original (point α of FIG. 4-2), the original is read to start the operation of forming an electrostatic latent image corresponding to the original image on the photosensitive drum 131 (Step 8).

In the meantime, it is determined whether or not the recycle lever 309 has fallen down, that is, whether or not the final original has reached (Step 9). If the recycle lever 309 has not yet fallen down, the separating roller 303 and the second clutch 365 are worked for a predetermined time to separate the next original from the original bundle 302. This original is moved into contact with the carriage roller 305 to form a loop (Step 9). In parallel with the above-described original reading, the next original is on stand-by in a looped form in contact with the carriage roller 305. When the second clutch 365 is engaged and the separating roller motor 321 is activated, the separating roller 303 and the carriage roller 305 are rotated to transport the next original through the path II. When the leading edge of the original reaches a position (point d) immediately before the platen glass 101, the original is stopped for stand-by (Step 10). This operation makes it possible to minimize the distance between the stand-by position of the next original and the predetermined position on the platen glass 101, thereby enabling the original to be moved in a reduced time (Refer to FIG. 4-3). The above operation is executed by the time when the first scanning mirror 105 reaches a position corresponding to the trailing edge of the original which is being transported in the direction of arrow B. When the first scanning mirror 105 reaches the trailing edge of the original, the original reading operation is completed and the optical system motor 115 is reversed to move the first scanning mirror 105 in a direction opposite to that of arrow A (Steps 12, 13 and 14). At the same time, the carriage large roller motor 327 is turned on to rotate the carriage large roller 307, thereby discharging the exposed original (Step 15). It is then determined whether or not the recycle lever 309 has been fallen down (Step 16). If it has not yet fallen down, it is determined that the next original is on stand-by at point d immediately before the platen glass 101. The belt motor 323 is turned on to rotate the carriage roller 305 and the flat-face belt 306 in the forward direction, and the next original is moved at a full speed in a direction opposite to the direction of arrow B and is transported onto the platen glass 101 (Step 17). At this point in time, the leading edge of the original from which a copy has been produced, is clamped between the carriage large roller 307 and the carriage roller 311 (refer to FIG. 4-4). Accordingly, the original is reliably discharged onto the tray 301. Then, the optical system is reset to and halted at the home position (Step 18) and the process returns to Step 4, where it waits for the next original to be positioned at the position $\gamma$ on the platen glass 101. If the recycle lever 309 falls down, it is determined that the next original is the last one, and after the next original has been discharged, the operation is completed (Step 20).

By repeating the operation explained in connection with FIGS. 4-1 to 4-4 and Steps 3-18, a continuous copying operation is enabled.

The respective moving speeds of the first scanning mirror 105 and the flat-face belt 306 and the coincidence of the optical system and the original's leading edge will be explained with reference to FIGS. 4-1 to 6. In the following description, it is assumed that SM represents the moving speed the first scanning mirror 105, SB the moving speed of the flat-face belt 306, the circumferential speed SD of of the photosensitive drum 131 in the main body of the copying machine, l1 the length of the original, l2 the distance between the position $\alpha$ where the read position of the first scanning mirror 105 coincides with the original's leading edge and the position of the nip between the carriage roller 311 and the carriage large roller 307, and l3 the distance between the position $\alpha$ where the read position of the first scanning mirror 105 coincides with the original's leading edge and the original's trailing edge.

It is further assumed that the relative speed difference SM+SB between the first scanning mirror 105 and the flat-face belt 306 is set to a speed (SM+SB=SD) equal to the circumferential speed SD of the photosensitive drum 131. This setting makes it possible to form an electrostatic latent image of equal quality on the photosensitive drum 131, whether or not the RDF is in use. Accordingly, it is possible to produce a copy image of the same quality in either case.

If the intervals of transporting originals onto the platen glass 101 are to be made as small as possible, originals on the platen glass 101 must be replaced at a close timing. Accordingly, it is necessary that, when reading of a desired original is completed, the leading edge of the original be reliably nipped between the carriage roller 311 and the carriage large roller 307. Accordingly, it is necessary to satisfy the condition $l2/SB \leqq l3/SM$, where $l3 = l1 - l2$. By satisfying the above two conditions SM+SB=SD and $l2/SB < l3/SM$, it is possible to realize an original replacement without taking account of loss time which results from the intervals of close original replacement.

Figure 7:
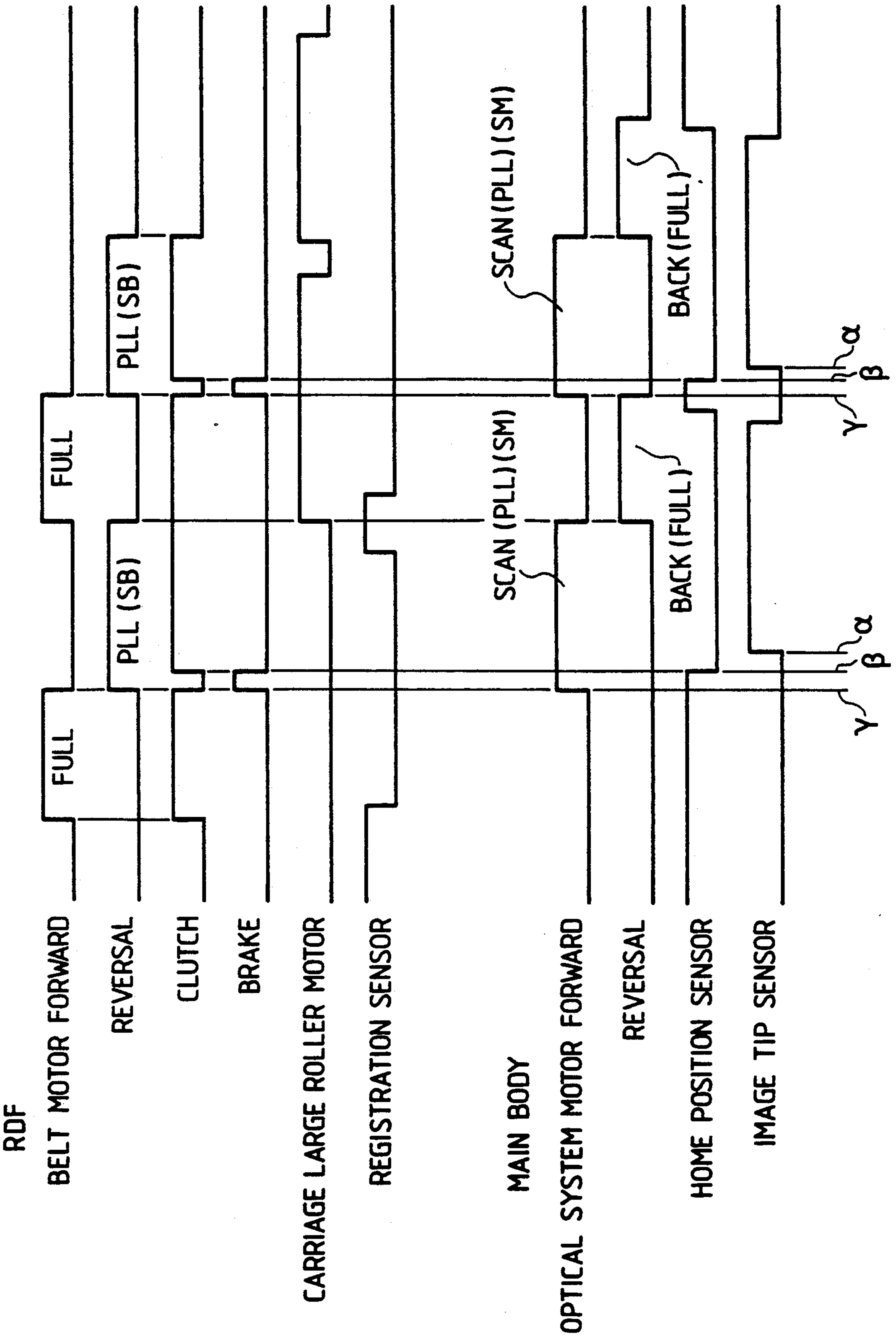
FIG. 7 is a timing chart which serves to illustrate the read operation.

Referring further to FIG. 7, which is a timing chart of the operation of the apparatus of the above embodiment, the operation of positioning an image tip will be explained in detail below. In the above embodiment, at the instant when the optical system reaches the point $\beta$ positioned ahead of the home position sensor 119, the movement of the original, whose leading edge is positioned at point $\gamma$, is started so that both coincide with each other at point $\alpha$. In this arrangement, the point $\alpha$ is set to a position corresponding to the timing of turning on the image tip sensor 117, that is, image tip timing which is the same as that utilized in normal scanning when the RDF is not used. In practice, in order to cause the leading edge of the original to coincide with the home position sensor 119 at the point $\alpha$, the position of the point $\gamma$ may be determined so that the time TM required for the optical system to move from the point $\beta$ to the point $\alpha$ can be made equal to the time TB required for the original to engage the first clutch 361 and move from the point $\gamma$ to the point $\alpha$. The time TB is the time required from the flat-face belt 306 to rise from zero to its steady speedy. Accordingly, although the time TB is an uncertain factor, it will be readily understood by those skilled in the art that the above setting is feasible, for example, by means of position adjustment.

Even if the timing changes due to a deterioration in clutch, motor, etc. with time, the change may be corrected in the following manner: the CPU 501 counts, for example, signals from the encoder (belt FG) 357 within the time TB to consistently check the status, thereby shifting the position of the point $\gamma$ to correct the amount of deviation.

[Another Embodiment]

Figures 1, 4:
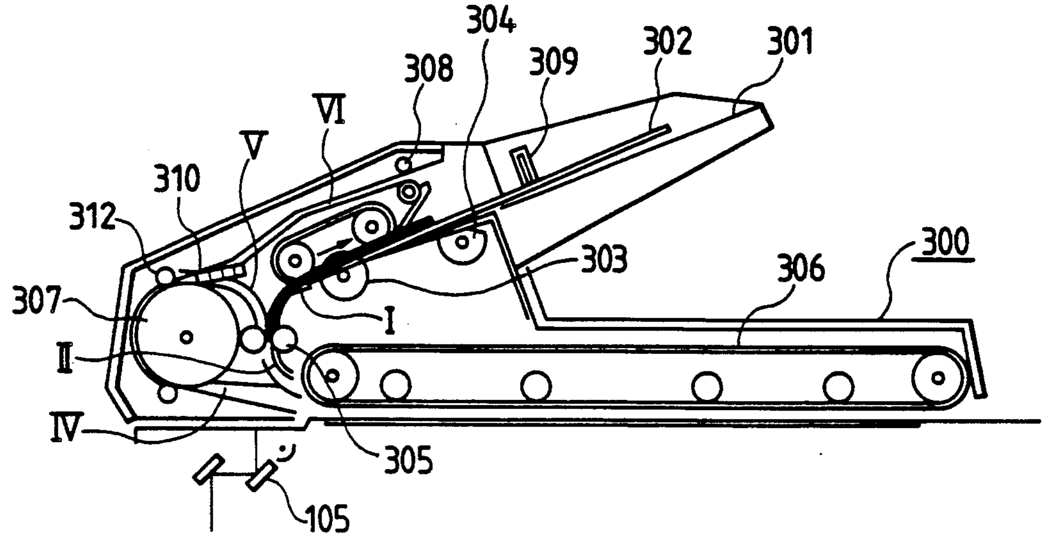
Figures 2, 4:
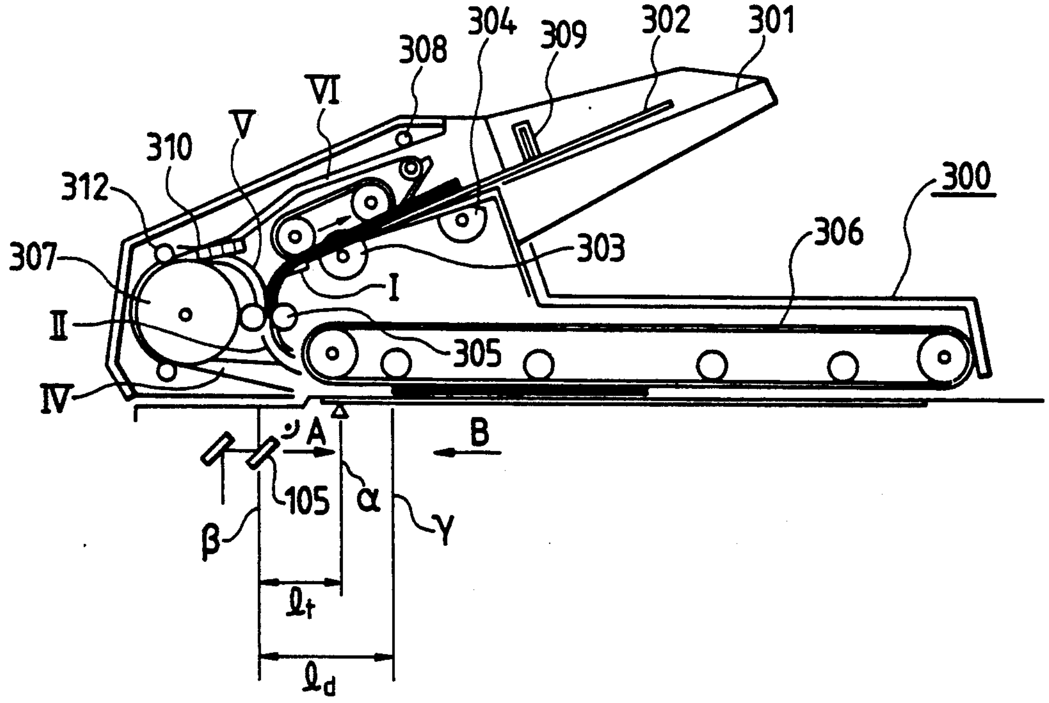
Figures 3, 4:
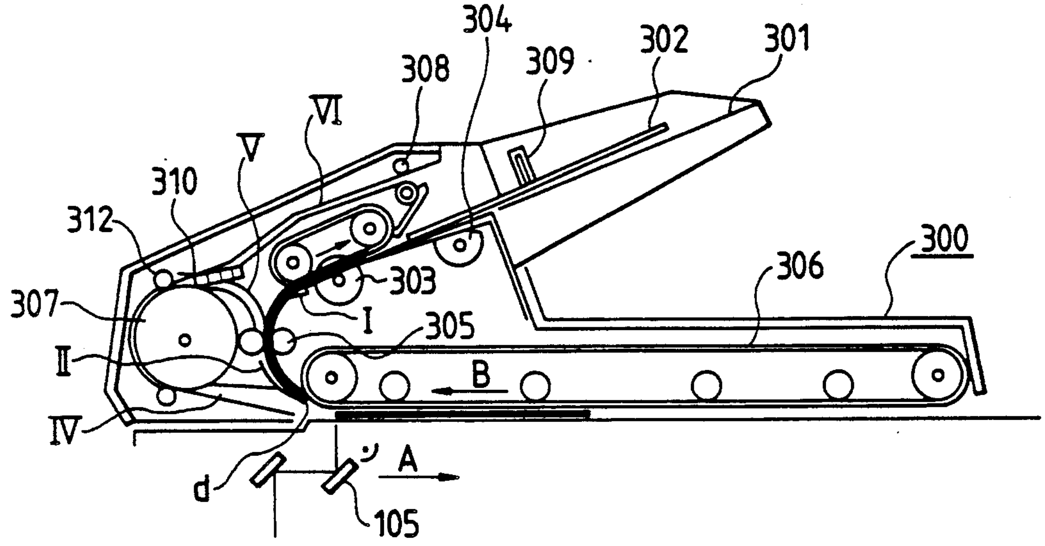
Figure 4:
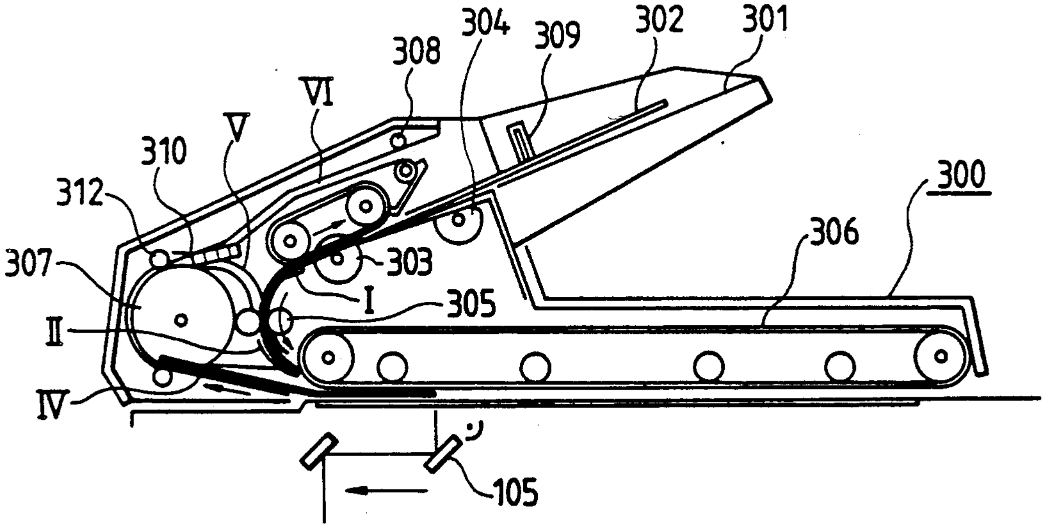
Figures 5, 5A, 5B, 5C:
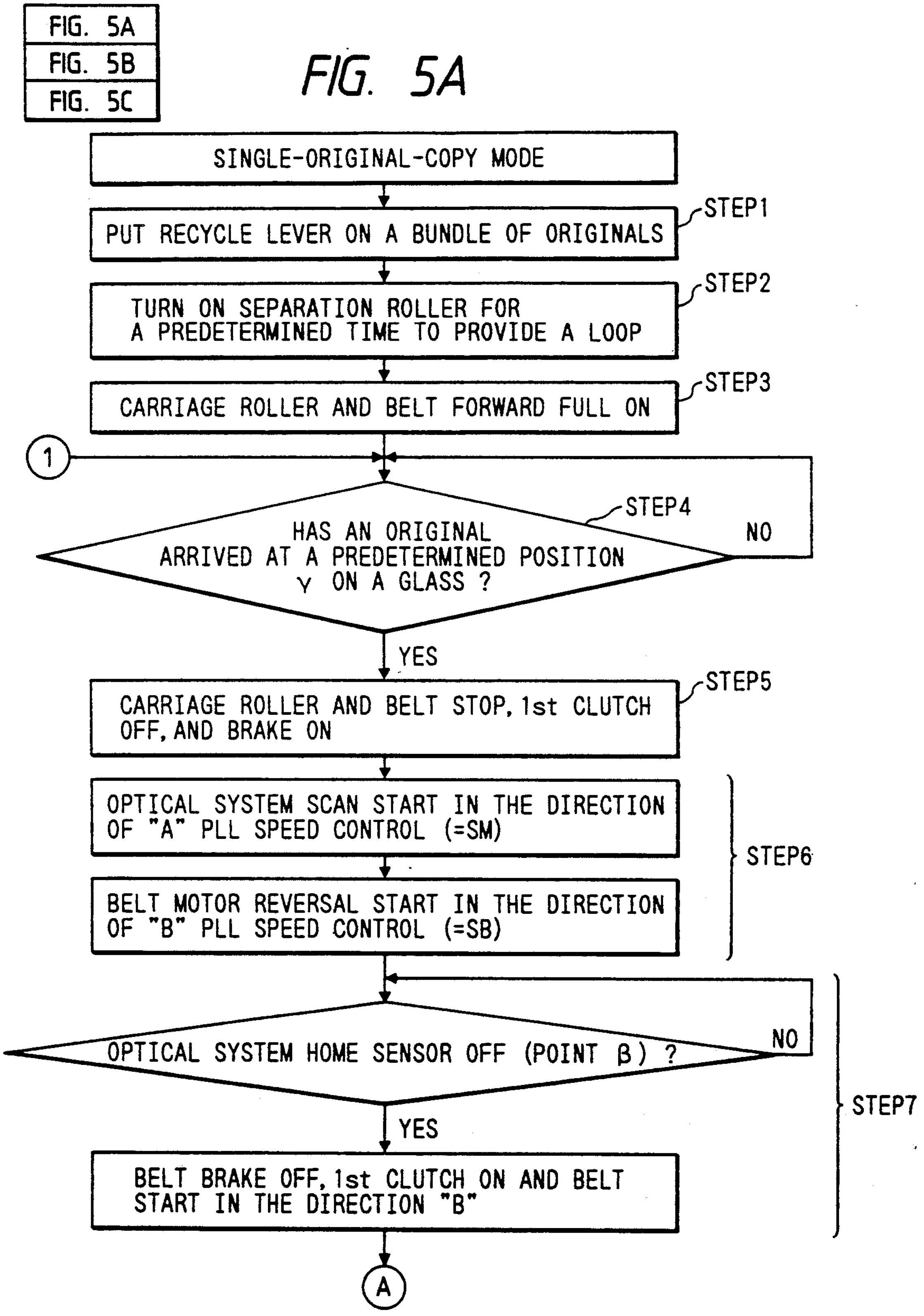
FIGS. 5, 5A-5C constitute a flowchart which serves to illustrate a read operation in the above embodiment.
Figure 5B:
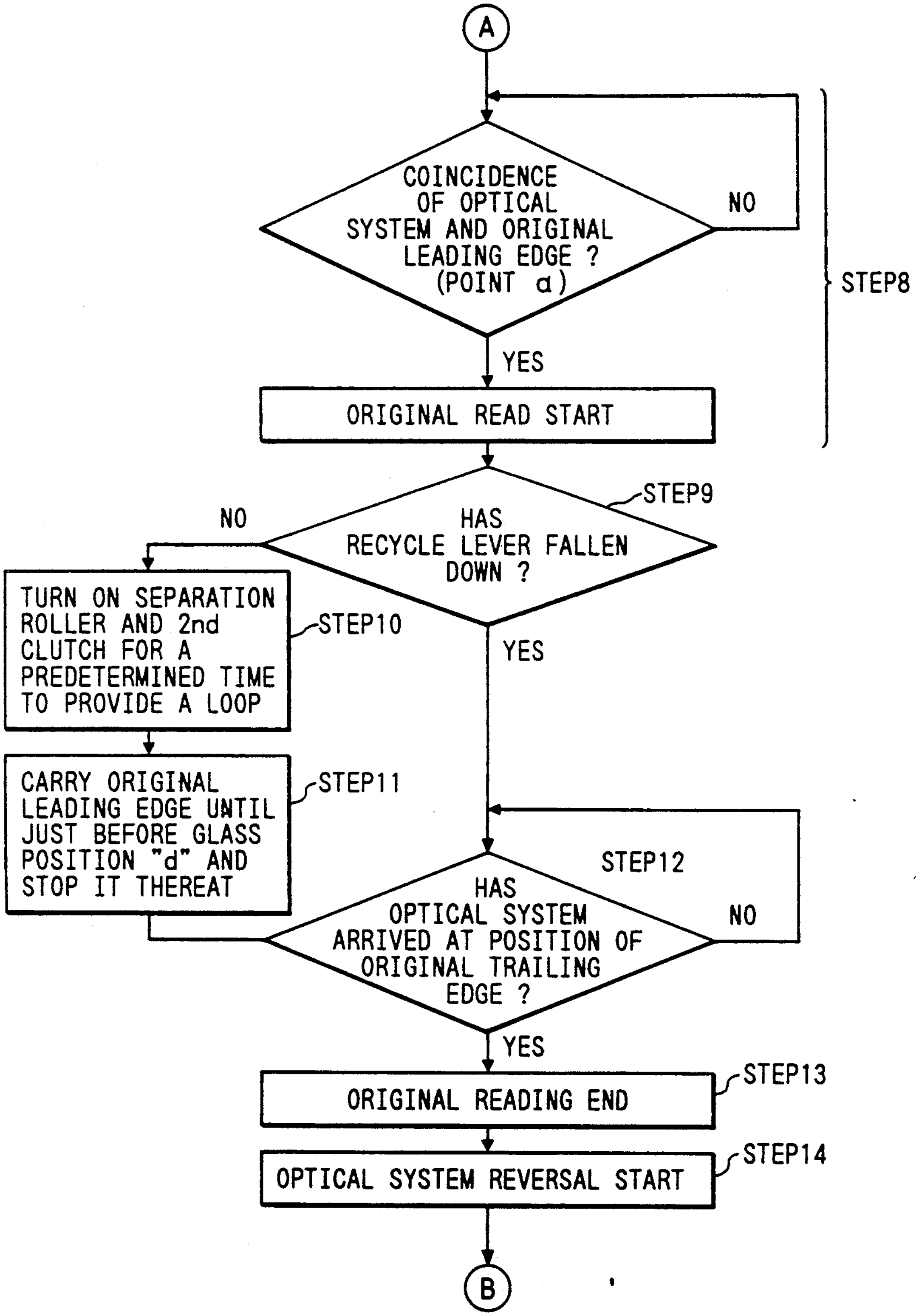
Figure 5C:
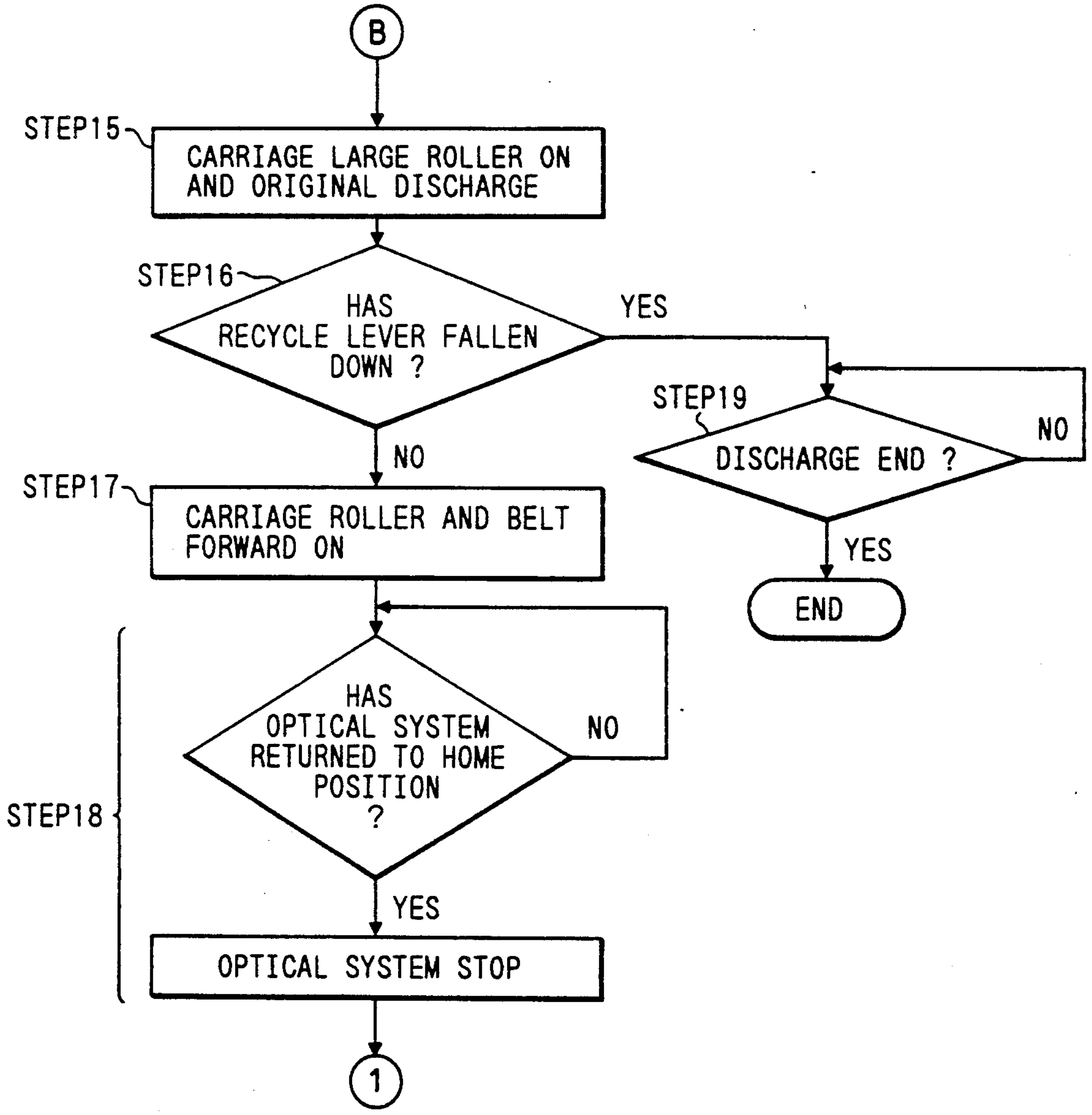
Figures 1, 8:
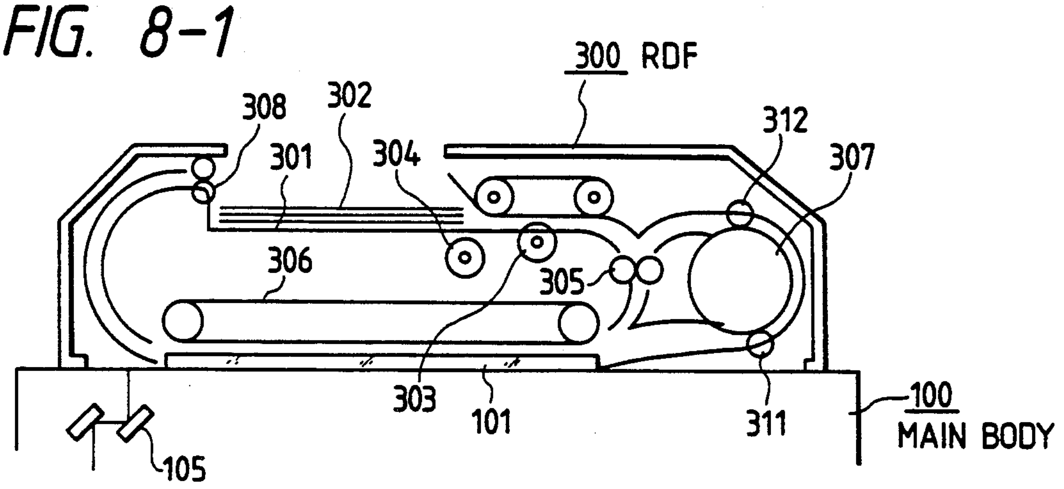
Figures 2, 8:
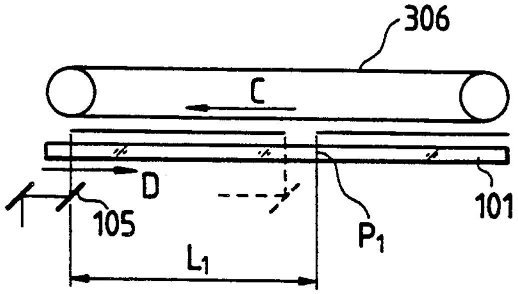
Figures 3, 8:
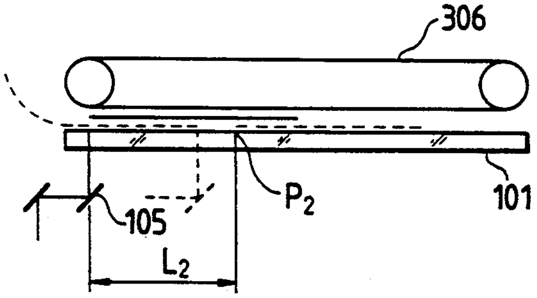
Figures 4, 8:
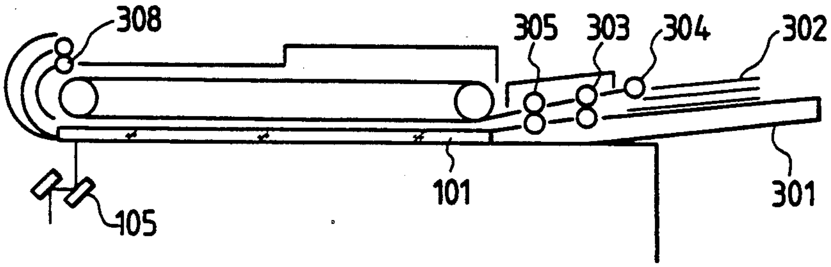

The following is an explanation, referring to FIGS. 8-1 to 8-4, of another embodiment in which an image reading operation is performed while image-reading means and a sheet original are being moved in mutually opposite directions in such a manner that they will pass each other.

FIG. 8-1 is a cross-sectional front elevational view showing another embodiment of the recycle original document feeder (RDF) according to the present invention. FIG. 8-4 is a cross-sectional front elevational view showing an automatic original document feeder (ADF), and FIGS. 8-2 and 8-3 are schematic views showing the operation of the RDF shown in FIG. 8-1.

In these figures, the same reference numerals are used to denote the like or corresponding elements shown in FIG. 1. In particular, the ADF of FIG. 8-4 is constructed so that each sheet is separated from the bundle 302 of "face-down" originals 302 by the cooperation between the upper separating rollers 304 and 303.

In this embodiment, the original is transported in the direction of arrow C over the platen glass 101, while the first scanning mirror 105 moves from the home position of the optical system shown in FIG. 8-1 in the direction of arrow D. When the reading part of the first scanning mirror 105 coincides with the leading edge of the original which is being transported, a reading operation is started. In this operation, the succeeding original is successively transported and its leading edge is positioned at the point P1 (FIG. 8-2). When the first scanning mirror 105 which is being transported coincides with the trailing position of the original, the reading operation is completed and the first scanning mirror 105 moves to the home position in the direction opposite to the direction of arrow D. Since the preceding original and the succeeding original are transported at the same speed, the leading edge of the succeeding original is positioned at the point P2. Accordingly, the succeeding original is transported by a distance corresponding to (L1=L2) during the reading of the preceding original. While the optical system is moving in a direction opposite the direction of arrow D, the succeeding original is further transported and the optical system again starts to move from the home position in the direction indicated by arrow D. When the optical system coincides with the leading edge of the succeeding original, reading of the succeeding original is started. By repeating the above operation in sequence, a continuous copying operation is enabled.

In the above arrangement, even while reading of the preceding original is being performed, the leading edge of the succeeding original is transported. Accordingly, as compared to the arrangement in which reading is performed by moving only the optical system while keeping the original at rest as disclosed in Japanese Patent Laid-Open Nos. 60-140364 and 61-32836 referred to in the description of the related art, the above embodiment enables originals at the reading part to be replaced at a timing which is reduced by an interval corresponding to the distance (L1−L2). If the transporting speed of the succeeding original is increased compared to the transporting speed in an ordinary reading operation from the time when the optical system coincides with the trailing edge of the original until it returns to the home position, it is possible to further reduce the time required to replace originals.

As a matter of course, the embodiment is provided with an arrangement having at least two modes: the mode of effecting image reading by causing an optical system to scan an original which is halted at a predetermined position and the mode of effecting image reading by moving the original and the optical system in mutually opposite directions in such a manner that they pass each other. These modes can be switched by means of a selector switch 120.

According to the embodiments described above, since image reading is effected while the scanning means and the original are being moved in mutually opposite directions in such a manner that they pass each other, relative reading speed can be increased without the need to increase the speed of movement of the original. In addition, since the intervals of transportation of originals can be reduced, it is possible to remarkably improve a throughput, such as productivity, while minimizing the probability that imperfect images such as blurred images will be formed.

Since the scanning means is continuously moved, an excessive temperature rise can be prevented. Also, since scan control is easy, a low-cost, compact arrangement can be achieved.

The following is an explanation yet another embodiment in which the reversing position of a scanning means is varied, depending on an original size.

Figures 1, 9A:
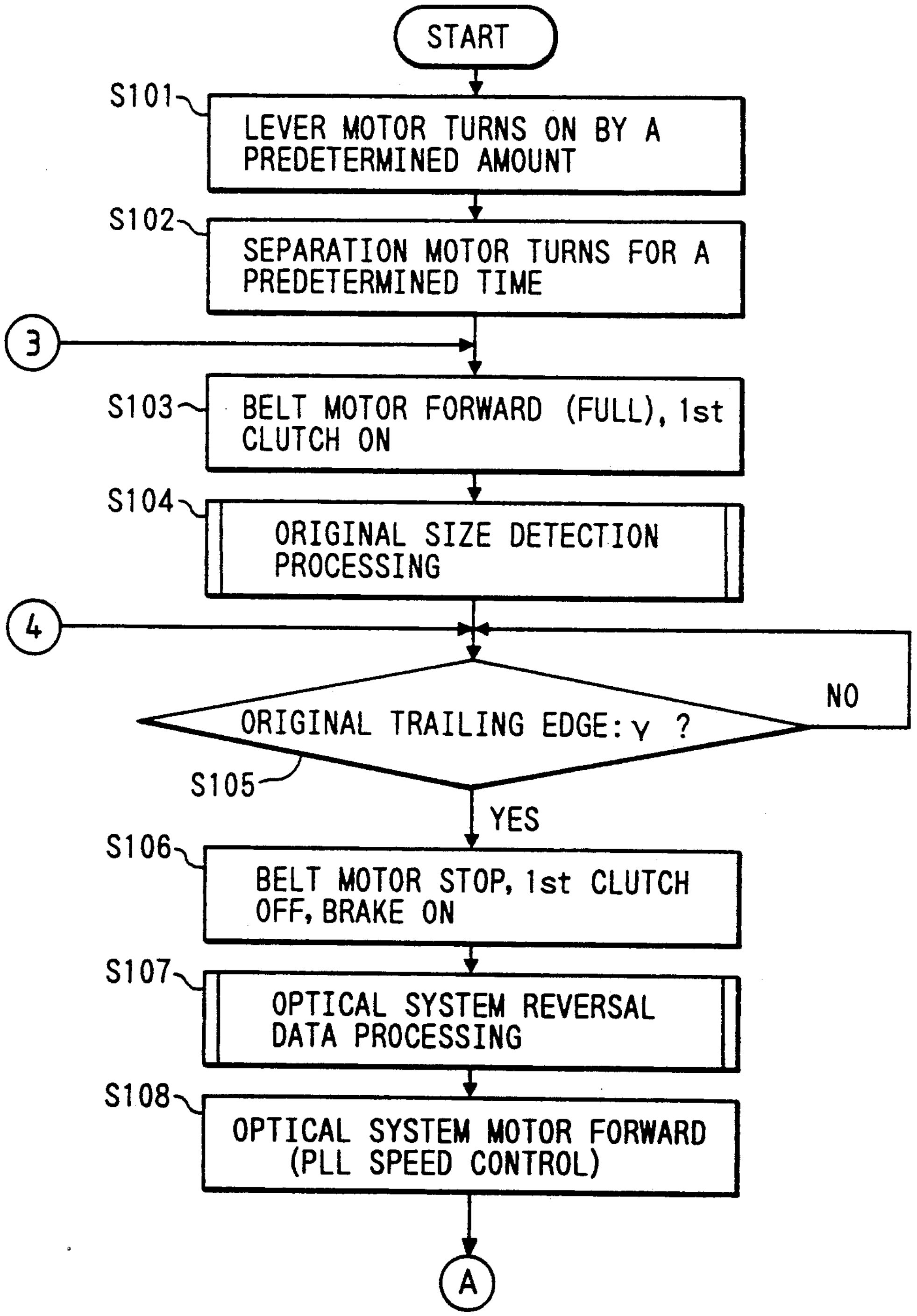
Figures 2, 9A:
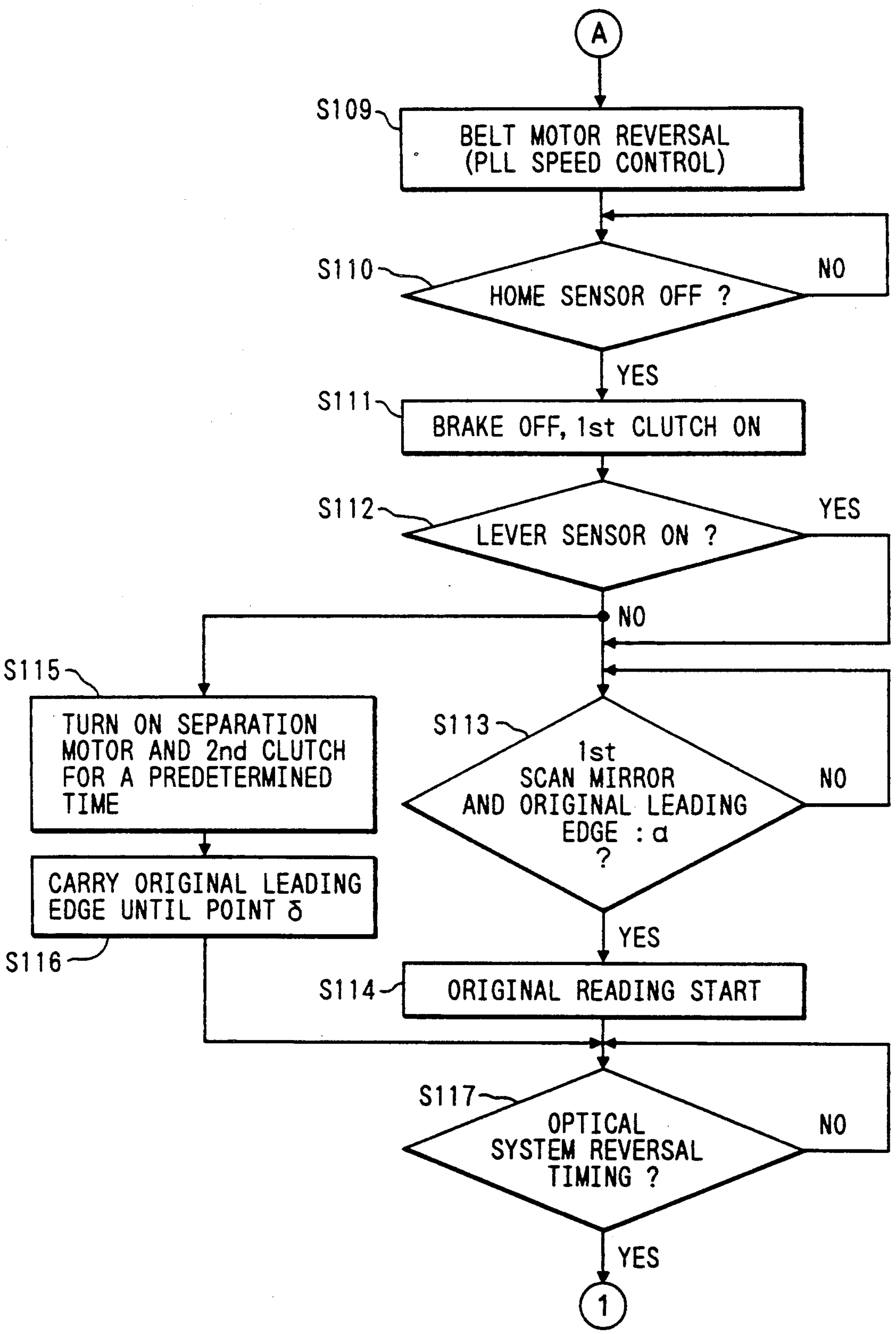
Figure 9B:
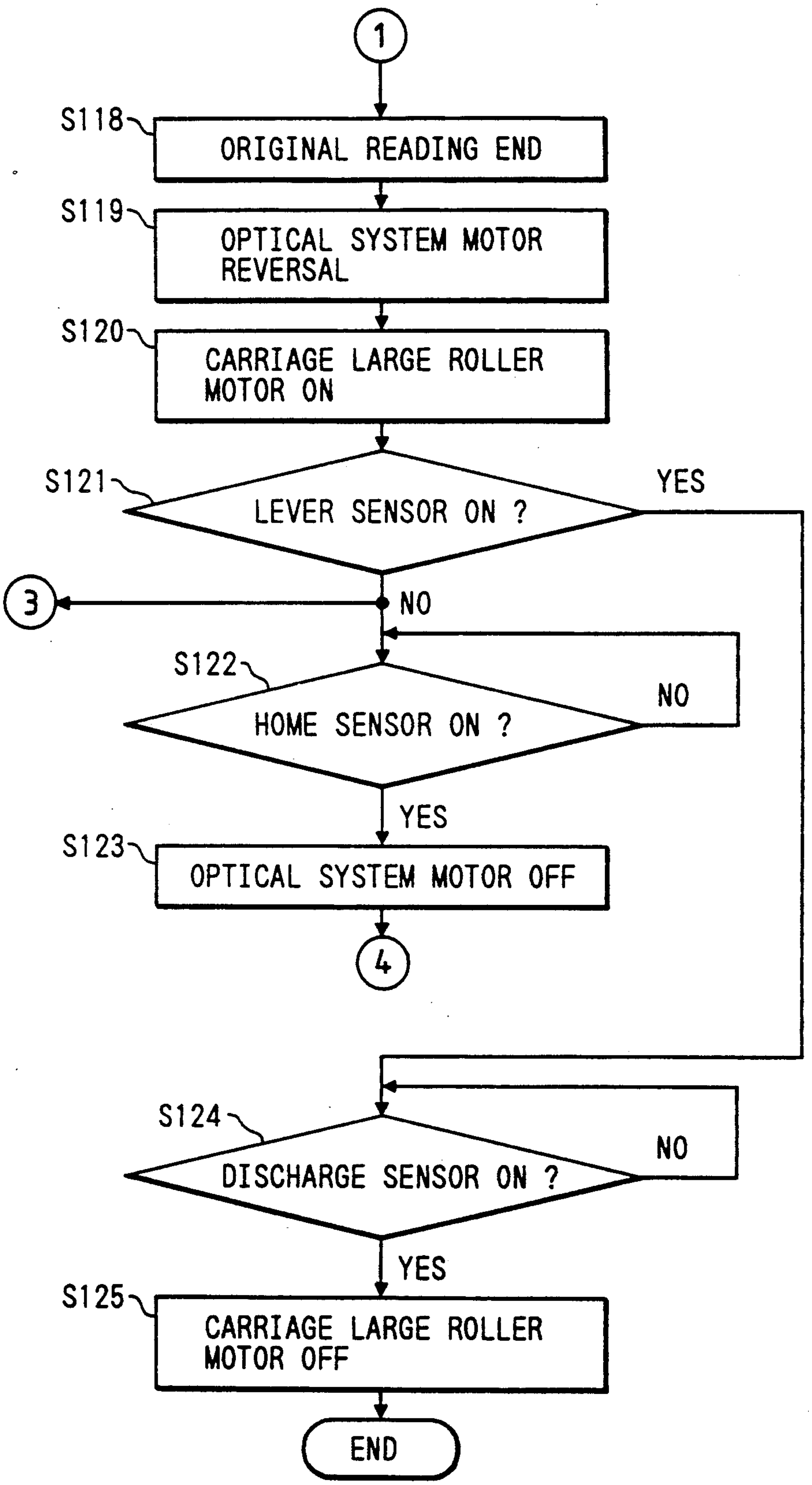

FIGS. 9A and 9B are control flowcharts showing this embodiment, and the operation of the embodiment is explained with reference to these figures as well as FIGS. 4-1 to 4-4 and 7 and the flowcharts of FIGS. 9A–9B.

When a plurality of originals 302 are placed on the stacking tray 2 as shown in FIG. 4-1 and a copy start key is turned on, the lever motor 329 (M4) is actuated by a predetermined amount to place the recycle lever 309 on the aforesaid originals 302 (Step 101). Then, the separating roller motor 321 (M1) is actuated by a predetermined period to cause the semicircular roller 304 and the separating roller 303 by a predetermined amount, thereby separating one sheet from the bundle of original at the lowermost position thereof. The leading edge of the separated original is brought into contact with the carriage roller 353 to loop the original, thereby preventing it from moving obliquely (Step 102).

Subsequently, the first clutch 361 is engaged and, at the same time, the belt motor 323 (M2) is actuated forwardly, thereby causing the carriage roller 353 and the flat-face belt 306 to rotate at full speeds in the direction indicated by arrow a (Step 103). Thus, while a size detection processing for the original 302 is being performed, the original 302 is transported onto the platen glass 7 via the path II. The size detection processing will be explained in detail later.

When, as shown in FIG. 4-2, the trailing edge of the original 302 is transported to the predetermined position γ on the platen glass 101, the belt motor M2 is halted, and the first clutch 361 is disengaged and the brake 363 is energized. Thus, the transportation of the original is stopped instantaneously (Steps 105 and 106).

Then, an optical system reversal data processing is executed (Step 107), and the optical system motor 115 (M5) is actuated forwardly at a predetermined speed under PLL speed control to move the first scanning mirror 105 in the direction of arrow c. At the same time, the belt motor M2 is actuated reversely at a predetermined speed under PLL speed control to rotate the flat-face belt 306 in the direction of arrow b (Steps 108 and 109).

When the home position sensor 119 is turned off, that is, when the first scanning mirror 105 reaches the point β, the brake 363 is de-energized and the first clutch 361 is engaged to transport the original 302 at a predetermined speed in the direction of arrow b (Step 110, 111). In this manner, the first scanning mirror 105 and the original 302 are moved at the respective predetermined speeds in mutually opposite directions in such a manner that they pass each other.

Then, reading of the original 302 is started at the instant (point α) when the first scanning mirror 105 coincides with the leading edge of the original 302. Simultaneously with the read operation, a latent image corresponding to the read information is formed on the photosensitive drum 131, whereby an image is recorded on a recording sheet. In addition, when the first original 302 is transported in parallel with the aforesaid reading operation, if the lever sensor 359 is not turned on, that is, if the recycle lever 309 has not yet fallen down, it indicates that the second original exists on the stacking tray 301. Accordingly, the separating motor M1 and the second clutch 365 are energized for a predetemined time to transport the leading edge of the second original to the carriage roller 305 so that the original is looped to prevent it from moving obliquely. Thereafter, the leading edge of the original is transported to a position (point $\alpha$) immediately before the platen glass 101, and placed in a stand-by state (Steps 112-116). This is because the time required to transport each original for reading the second sheet et sqq. is minimized.

As shown in FIG. 4-4, the aforesaid read operation is executed until the first scanning mirror 105 reaches a position corresponding to the data set in the optical system reversal data processing (Step 7). At this point in time, the reading of the first original is completed (Step 118).

When the reading of the original is completed, the optical system motor M5 is reversed to return the first scanning mirror 105 to the home position (Step 119) and simultaneously to actuate a carriage large roller motor M3 to transport the original by means of the carriage large roller 307.

If the second original or a subsequent original remains, that is, if a lever sensor S4 is off (Step 121), the process returns Step 103 of FIG. 9, where the second original is transported onto the platen glass 101. At this time, the second original is transported onto the platen glass 101 by the rotation of the flat-face belt 306 before the original which has been read returns to the stacking tray 301. However, there is no problem since the read original has already been nipped between the carriage large roller 307 and the carriage roller 311. In parallel with the aforesaid original transporting operation, it is determined whether or not the first scanning mirror 105 has returned to the home position (Step 122). When the first scanning mirror 105 returns to the home position, the optical system motor 115 (M>) is stopped and placed in a stand-by state at the home position (Step 123). Then, the process returns to Step 104 of FIG. 9, where it waits for the trailing edge of the second original to stop at the predetermined position $\gamma$ on the platen glass 101.

If it is determined in Step 121 that there is no original on the stacking tray 301, that is, the lever sensor S4 is on, the original is returned to the stacking tray 301 by the carriage large roller 307, thereby completing the reading operation (Steps 124 and 125).

Figure 10:
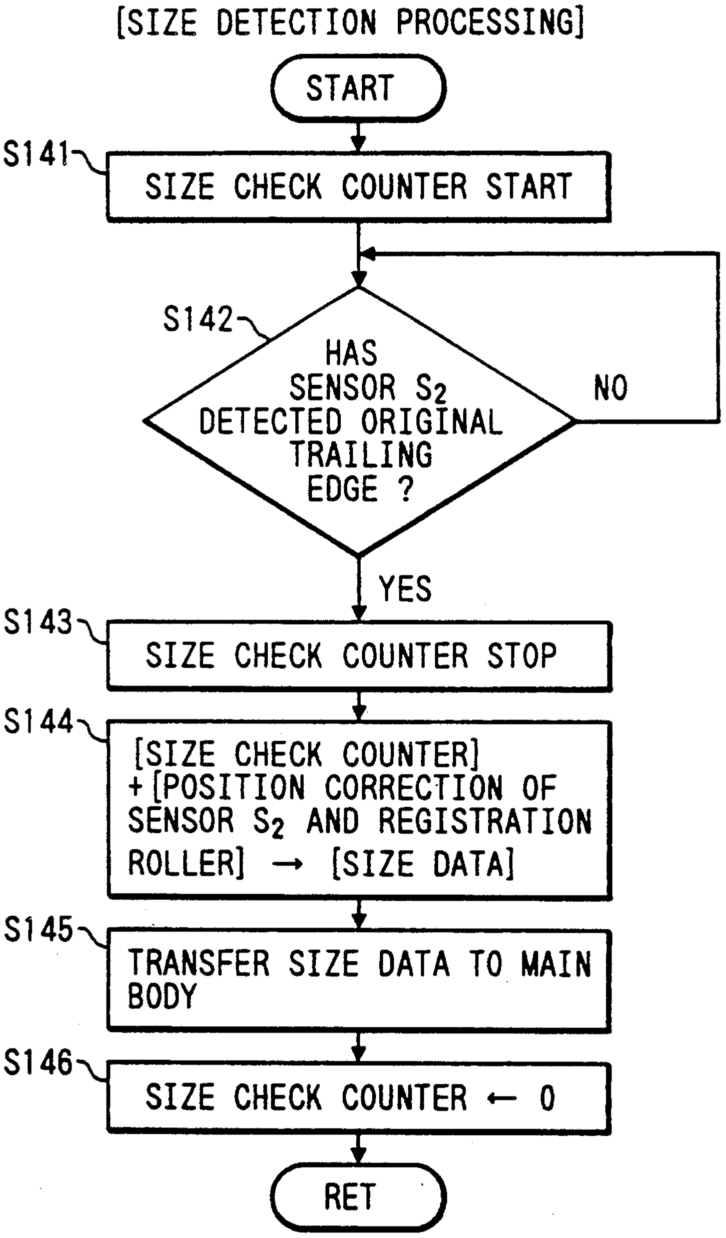
FIG. 10 is a control flowchart showing an original size detecting processing.

The following is an explanation, referring to the flowchart of FIG. 10, of the original size detection processing (Step 104 in FIG. 9) for changing the revering position of the first scanning mirror 105 in accordance with the original size.

In this processing, first of all, the belt motor M2 is actuated forwardly to cause the original an original from the path I to the path II by the driving of the carriage roller 305 and the flat-face belt 306 and, at the same time, size check counter is started. The size check counter performs counting operation in response to clock signals supplied from a belt clock interrupter (not shown) (Step 141).

The size check counter is stopped at the same time that the trailing edge of the original passes by the registration sensor 353 (S2) (Steps 142 and 143). The data obtained by the counting is added to a correction value corresponding to the distance from the nip position of the carriage roller 305 to the registration sensor S2, thereby preparing an actual original size l1. The thus-detected original l1 is transmitted as data to the main body of the apparatus, and the process initializes the size check counter and returns the previous step (Steps 145 and 146). In this manner, the size of the original to be transported is detected.

Figure 11:
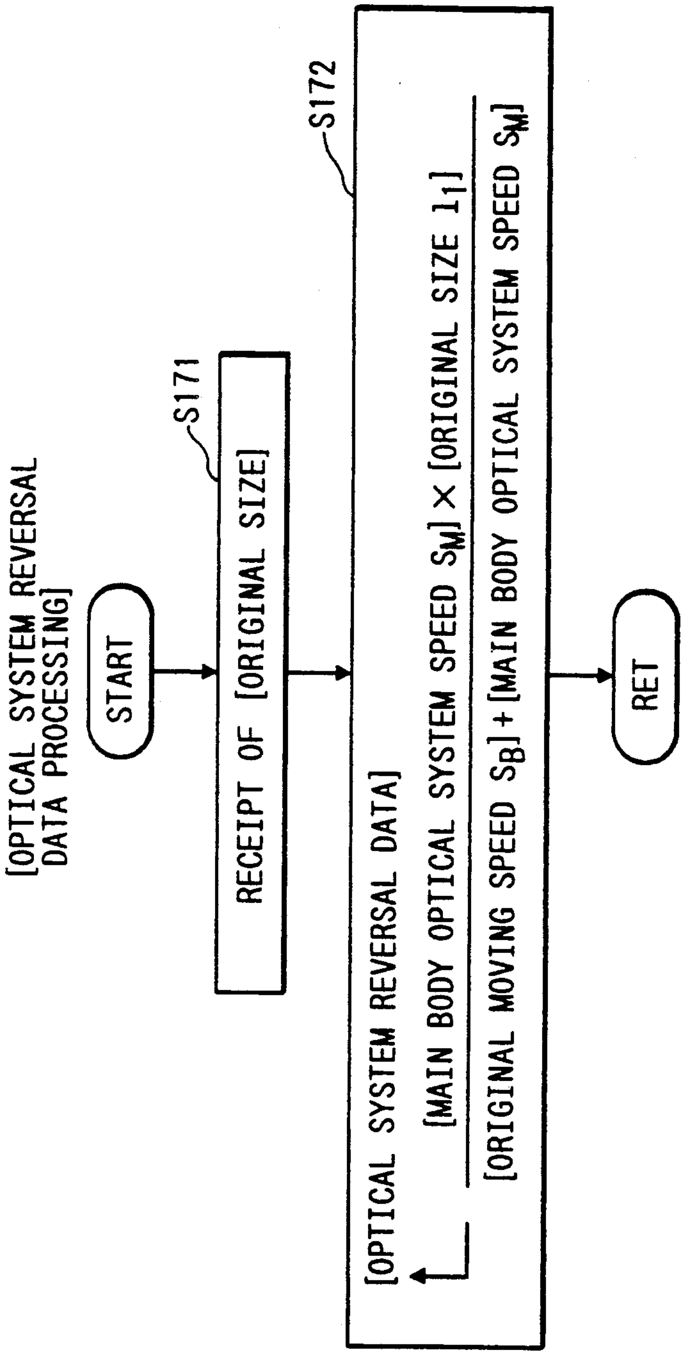
FIGS. 11, 12 and 13 are control flowcharts showing an optical system reversal data processing.

The following is an explanation, referring to the flowchart of FIG. 11, of an optical system reversal data processing (Step 7 of FIG. 9) for setting the reversing of the first scanning mirror 105 in accordance with the original size l1. As shown in FIG. 11, the main body of the apparatus receives data representing the original size l1 obtained in the above original size detecting processing. Then, a distance l3 to the reversing position of the first scanning mirror 105 shown in FIG. 6 is calculated as follows by using the above data, the moving speed SM of the first scanning mirror 105 that is set by PLL speed control, and the moving speed SB of the original transported by the belt motor M2:

$$l3 = SM \cdot l1/(SM+SB) \quad (1)$$

The data thus calculated is set as reversal data l$\gamma$ (Step 172).

Figure 6:
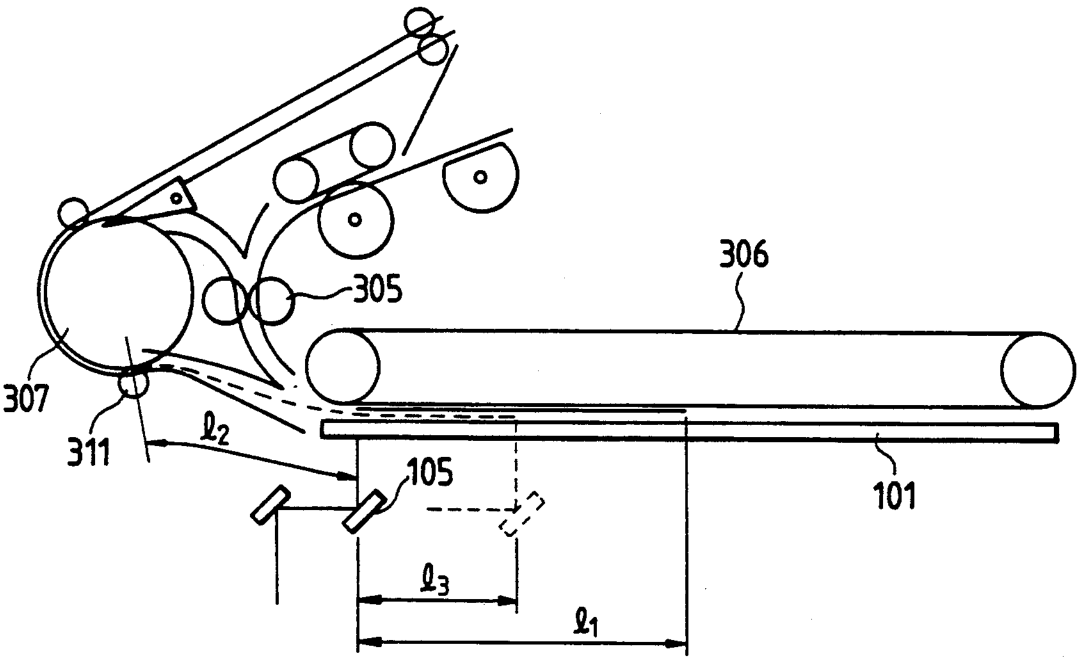
FIG. 6 is a schematic view showing the relationship between RDF and the optical system in the above embodiment.

Accordingly, at the instant when the distance traveled by the first scanning mirror 105 of FIG. 6 from an image tip coincidence point $\alpha$ becomes equals to the aforesaid reversal data distance l3, it is determined in Step 117 of FIG. 9 that the reversal timing has been reached. The first scanning mirror 105 is reversed at the corresponding position. In this manner, the first scanning mirror 105 is reversed in accordance with each original size, whereby the reading of the original is performed efficiently and rapidly.

The following is an explanation of a procedure for effecting variable setting of the reversing position of the first scanning mirror 105 in accordance with a cassette size (the size of a recording sheet) and a copy magnification each of which is selected by an operator.

Figure 12:
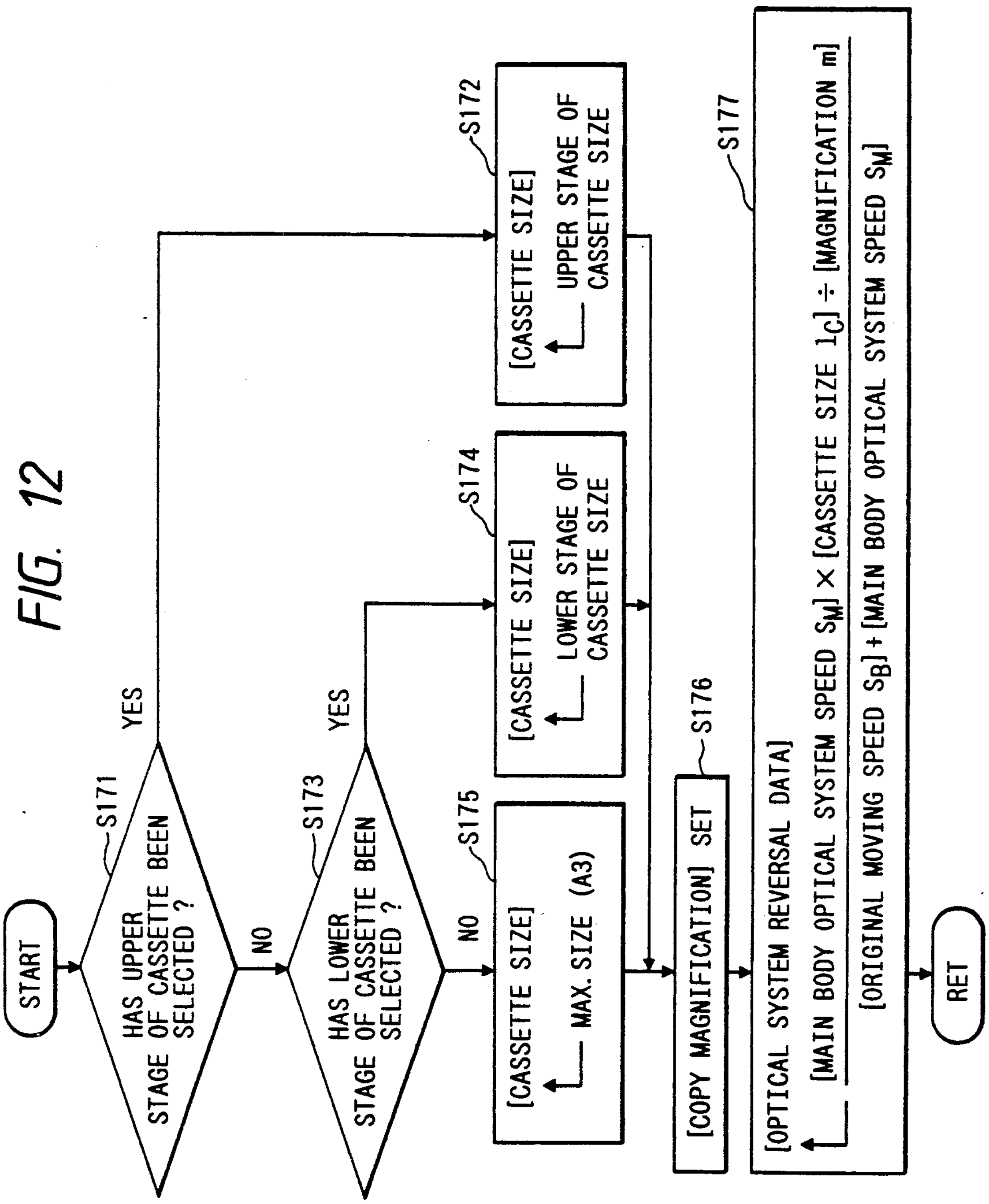

In this procedure, an optical system reversal data processing is executed as shown in the flowchart of FIG. 12.

In the apparatus shown in FIG. 1, it is determined whether the upper stage cassette 151 has been selected by an operator (Step 171). If the upper stage cassette 151 is selected, a cassette size lc is set to the upper-stage cassette size (for example, B5 size) (Step 172). If it is determined in Step 171 that the upper stage cassette 151 is not selected, the process proceeds to Step 173, where it is determined whether or not a lower stage cassette 153 is selected. If the lower stage cassette 153 is selected, the cassette size is set to the lower stage cassette size (for example, B4 size) (Step 174). If it is determined in Step 173 that the lower stage cassette 153 is not selected, it is determined that a manual feed mode is selected, and the cassette size lc is set to the maximum size (for example, A3 size) which can be handled by the apparatus. Then, a copy magnification m (e.g., a magnification of $\times 2$) is set as selected by the operator.

Then, the reversal data l$\gamma$ of the first scanning mirror 105 is calculated as follows by using the cassette size lc, the copy magnification m, the moving speed SM of the first scanning mirror 105 and the moving speed SB of the original transported by the driving of the belt motor M2:

$$lr = (SM \cdot lc/m)/(SM+SB) \quad (2)$$

The result is set to the reversal data of Step 105 shown in FIG. 9 (Step 177).

In this manner, the first scanning mirror 105 is reversed at a position corresponding to the cassette size l1 and the copy magnification m.

The following is an explanation of a procedure for setting a reversal timing. In this procedure, the reversing position of the first scanning mirror 105, which is calculated from the moving speed SM of the first scanning mirror 105 and the moving speed SB and original size l1 of the original, is compared with the reversing position of the first scanning mirror 105 which is calculated from the size SM of a recording sheet and the copy magnification m. The reversing position of the first scanning mirror 105 which travels a shorter distance is set as the reversal timing.

Figure 13:
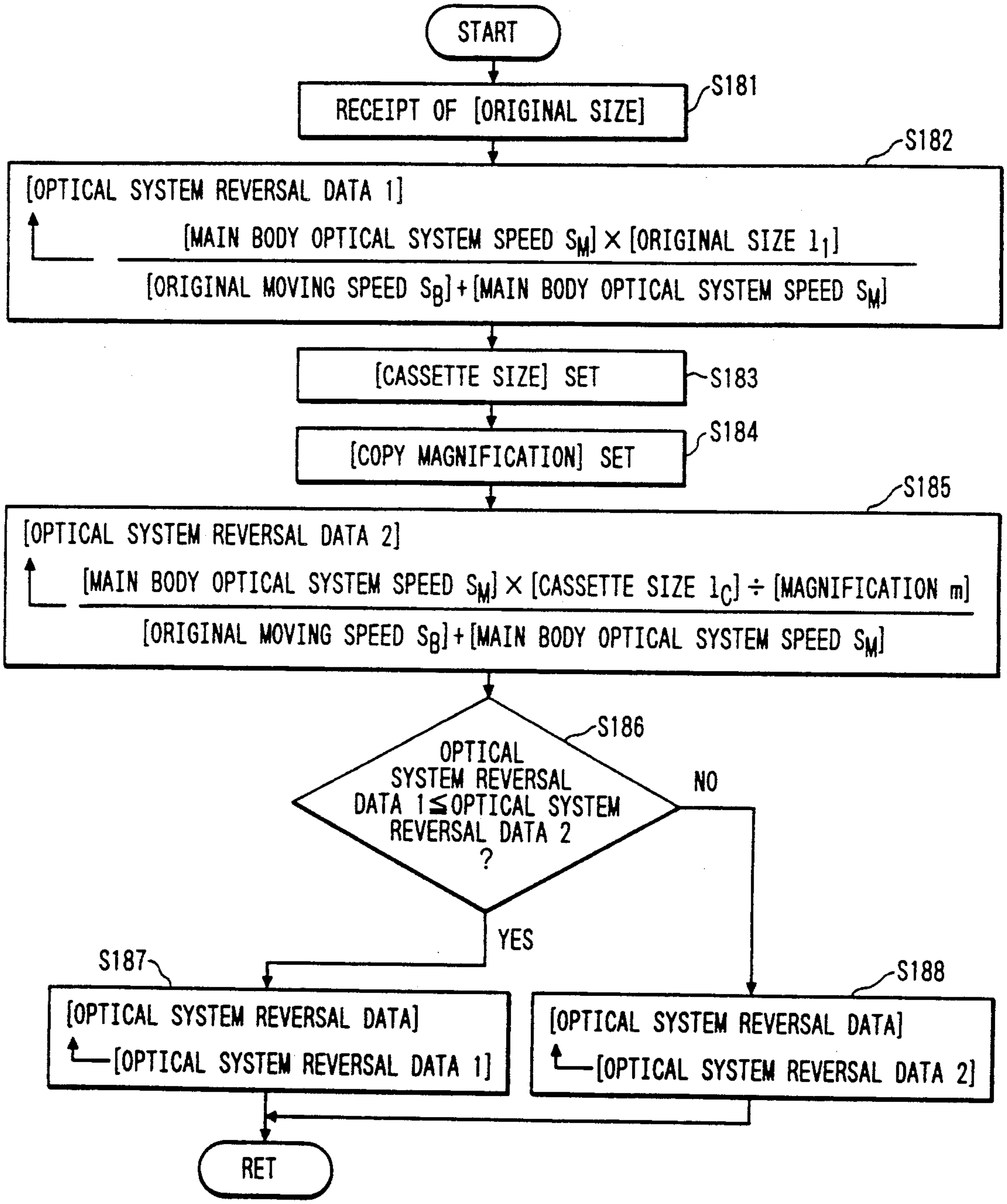

In this procedure, the optical system reversal data processing is executed as shown in the flowchart of FIG. 13.

First of all, as described previously, a particular original size is received (Step 181) and reversal data lr1 on the first scanning mirror 105 corresponding to the original size is calculated by using Equation (1)(Step 182):

$$lr1 = SM \cdot l1/(SM+SB)$$

Then, from the cassette size lc and the copy magnification m which are selected by the operator, reversal data lr2 on the first scanning mirror 105 is calculated by using Equation (2) (Steps 73–75)

$$lr2 = (SM \cdot lc/m)/(SM+SB)$$

Then, the data lr1 and lr2 are compared by a comparing means such as an operation amplifier (Step 186). If $lr1 \geqq lr2$, the data lr2 is set as reversal data, while, if $lr1 < lr2$, the data lr1 is set as reversal data (Steps 187 and 188).

In this manner, the data calculated from the original size is compared with the data calculated from the cassette and the copy magnification, and the first scanning mirror 105 is reversed on the basis of the data corresponding to a shorter moving distance. Accordingly, it is possible to effect efficient image reading in a reduced time.

As described above, the variable setting of the reversing position of the reading means remarkably improves the speed of image formation utilizing the reciprocal movement of the reading means. Accordingly, it is possible to remarkably improve a throughput.

The following is an explanation of another embodiment which has two kinds of multicopy mode. In one mode, originals are successively fed onto a platen by repeating a feed operation by a set number of times, and the originals are fed while the next originals are fed after the set number of copies have been produced. In the other mode, one copy is produced in each original feeding operation and the original is replaced with the next original, and this operation is repeated by the set number of times until the set number of copies is obtained.

Figure 14:
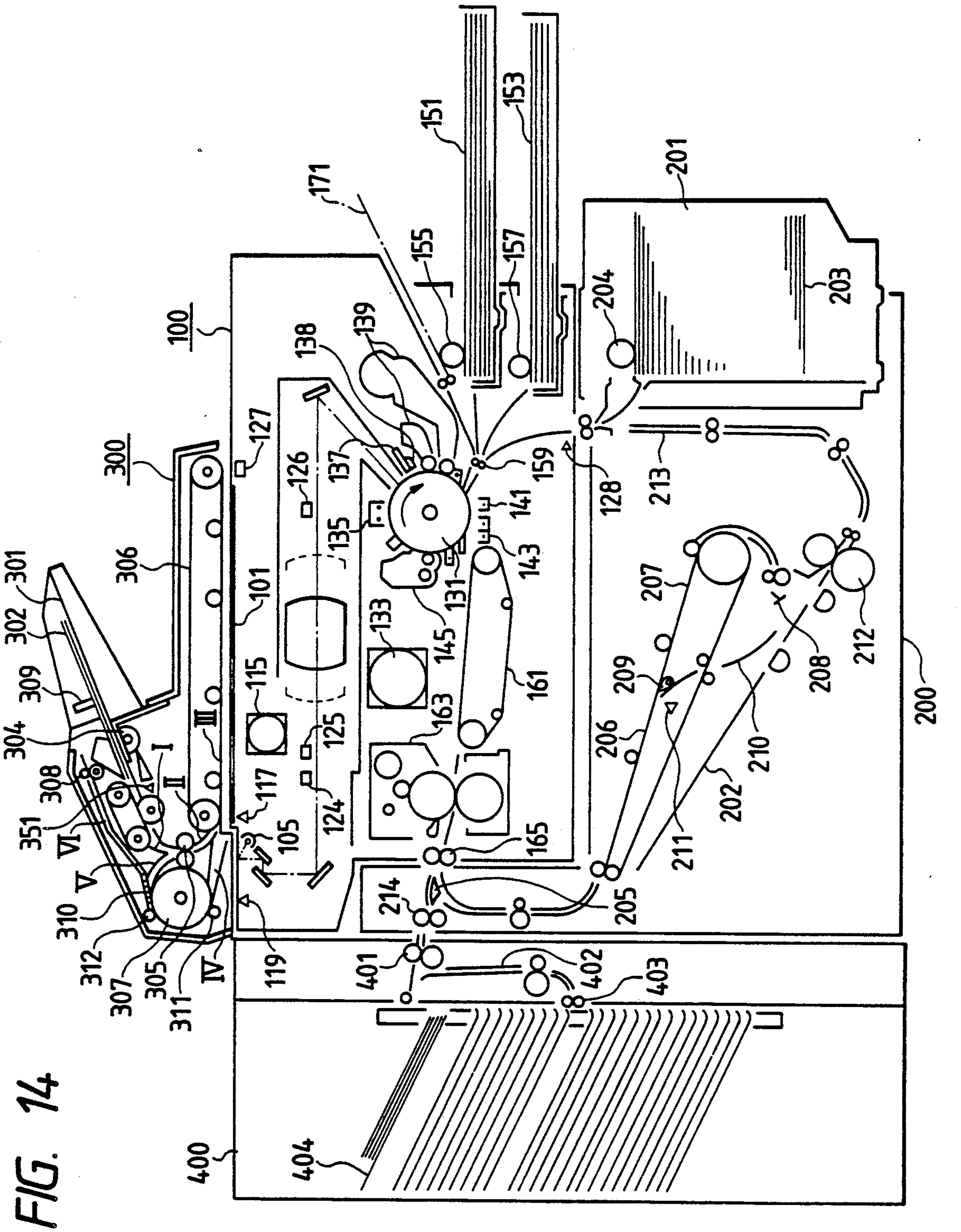
FIG. 14 is a diagrammatic cross-sectional view showing the internal of a copying machine to which another embodiment of the present invention is applied.

FIG. 14 is a cross-sectional view showing the inner construction of an image forming apparatus according to the above embodiment.

The apparatus shown in FIG. 14 basically comprises: the main body 100 having an image reading function and an image recording function; a pedestal 200 having the double-sided processing function of reversing a recording medium (sheet) during a double-sided recording and the multiple-recording function of repeating recording with respect to the same recording medium by a plurality of times; the automatic original document feeder (RDF) 300 for automatically feeding originals; and a sorter 400. The pedestal 200, the automatic original feeder 300 and the sorter 400 can be freely combined with the main body 100.

A. MAIN BODY (100)

In FIG. 14, the same reference numerals are used to denote the like or corresponding elements explained in the embodiment described previously.

Original size detecting sensors 124, 125 and 126 detect the presence or absence of an original on the original platen glass 101. A feeder switching detecting sensor 127 senses a timing immediately before the RDF 300 or a pressure plate (not shown) is closed. A pedestal sensor 128 is used for double-sided recording. A potential sensor 138 senses the surface electrode of the photosensitive drum 137.

B. PEDESTAL (200)

As shown in FIG. 14, the pedestal 200 is provided with a deck 201 capable of accommodating, for example, two thousand transfer sheets, and an intermediate tray 202 for double-sided recording. The deck 201 has a lifter 203 which rises in accordance with the number of transfer sheets so as to consistently maintain a transfer sheet in contact with a paper feed roller 204.

In FIG. 14, a discharge flapper 205 is disposed outside the main body 100 for switching a sheet feed path between the discharge side and the double-sided recording or multiple-recording side (sorter 400). A transfer sheet which is fed by discharge rollers 165 is switched to the double-sided recording or multiple-recording side by the discharge flapper 205. Carriage belts 206 and 207 reverse the transfer paper transported by the discharge rollers 165 and conduct it to the intermediate tray 202. A weight 208 serves to forces the accommodated transfer sheet against the intermediate tray 202. A multi-flapper 209 switches the sheet feed path between the double-sided recording side and the multiple-recording side. The multi-flapper 209 is disposed between the carriage belts 206 and 207 and rotates upwardly to conduct the transfer sheet to a multiple-recording transport path 210. A multi-sensor 211 senses the trailing edge of each transfer sheet passing by the multi-flapper 209. A paper feed roller 212 feed the transfer sheet to the photosensitive drum 131.

Discharge rollers 214 are disposed in the vicinity of the discharge flapper 205 for discharging the transfer sheet, switched to the discharge side by the paper feed flapper 205, out of the apparatus.

For double-sided recording or multiple-recording, the discharge flapper 205 is forced up, and copied transfer sheets are accommodated in the intermediate tray 202 in a state reversed by the carriage belts 206 and 207. For double-sided recording, the multi-flapper 209 is moved down, while the transfer sheets accommodated in the intermediate tray 202 are forced down by the weight 208. For the subsequent reverse-side recording or multi-recording, the transfer sheets accommodated in the intermediate tray 202 are conducted one-by-one from the lowermost position thereof to the registration roller 118 of the main body over the path 213 by the action of the paper feed roller 212 and the weight 208.

C. RDF (AUTOMATIC ORIGINAL DOCUMENT FEEDER) (300)

The RDF 300 has a construction similar to that shown in FIG. 1 and is capable of performing the following two operations when a one-sided original is handled. In one operation, the originals are separated from the original bundle 302 at the lowermost power thereof in a one-by-one fashion by means of the semicircular roller 304 and the separating roller 303, and each separated original is transported to the exposure position on the original platen glass 101 over the paths I and II by means of the other carriage roller 305 and the flat-face belt 306. At the same time that the image formation operation is started, the original placed on the carriage large roller 307 is transported over the path III to the path VI by means of the carriage large roller 307. Finally, the original is again placed on the top of the original bundle 302. In the other operation, at the same time that an image formation operation is started, the original is transported toward the carriage large roller 307 over the path III. The original is switched back via the path IV by the reverse rotation of the carriage large roller 307 and the movement of the flat-face belt 306 and transported to the exposure position on the platen glass 101.

During double-sided recording, the original is temporarily conducted to the path III through the paths I and II. At the path III, the leading edge of the original (original discharged from the platen) is conducted to the path IV by switching a switching flapper 311. The original is transported over the path II to the platen glass 101 by the carriage rollers 307 and 305. In other words, the carriage large roller 307 and the route formed by the paths III-IV-II are used to reverse the original. The number of originals can be counted by transporting the originals of the bundle 302 one by one over the paths I-II-III-IV-V until the recycle lever 309 detects the completion of one cycle of sheet feed operation.

D. SORTER (400)

The sorter 400 serves as a sheet postprocessing device for recording sheets such as transfer paper, and is provided with 25-bin trays for sorting. The image-formed transfer paper is sequentially discharged from the main body 100 through the discharge rollers 214, captured by carriage rollers 401 in the sorter 400, and inserted into each bin 404 through a path 402 by discharge rollers 403.

Figure 15:
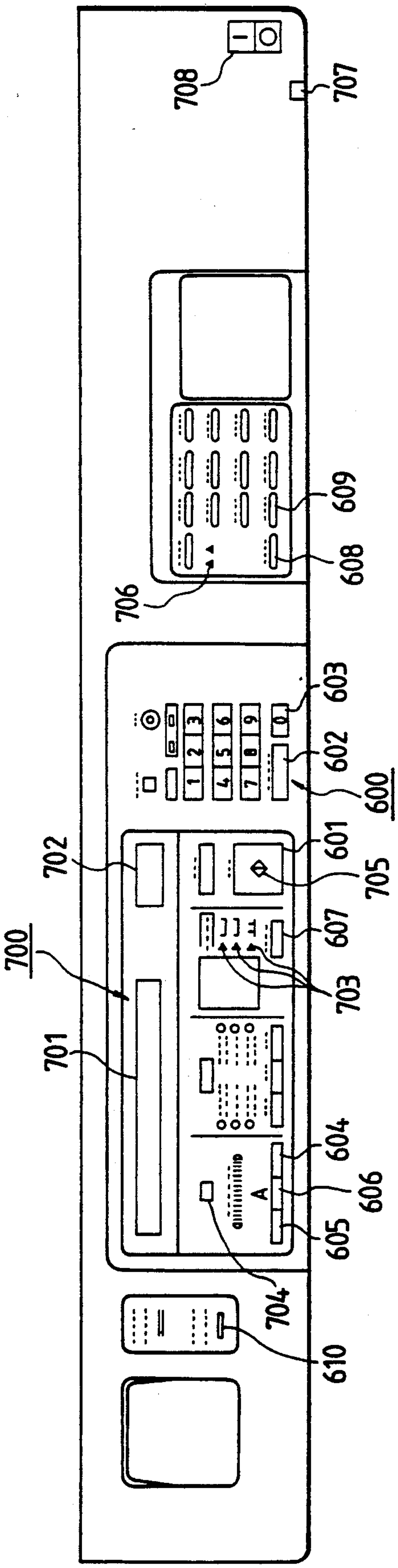
FIG. 15 is a top plan view showing the operating section of the copying machine shown in FIG. 14.

FIG. 15 shows an example of the configuration of an operation panel provided on the aforesaid main body 100. The operator panel is provided with a key group 600 and a display group 700 which will be explained later.

E. KEY GROUP (600)

Referring FIG. 15, a copy start key 601 is pressed to start a copy operation. A clear/stop key 602 functions as a clear key in a stand-by state and a stop key during a copy operation. A ten-key pad 603 is pressed to set the number of copies, and copy density keys 604 and 605 are pressed to manually adjust copy density. An AE (automatic exposure) key 606 is pressed when it is desired to automatically adjust copy density in accordance with the density of each original or when it is desired to switch the density adjustment from AE control to manual control. A cassette selecting key 607 is pressed to select the upper stage cassette 114, the lower stage cassette 115 or the deck 201. A double-sided copy key 608 is pressed when a double-sided copy is produced from a one-sided original, when a double-sided copy is produced from a double-sided original or when a one-sided copy is produced from a double-sided original. A two-color multi-key 609 is pressed when images of different colors are formed (synthesized) on the same surface of copy paper from one original. A selection key 610 is used to select a discharging method (sorting or grouping). If a sorting tray (sorter) is connected to the main body 100, it is possible to select or cancel the sorting mode or the group mode.

F. DISPLAY GROUP (700)

Referring to FIG. 15, an LCD(liquid-crystal device) type of message display reproduces one character consisting of, for example, 5×7 dots. The message display 701 is a semi-transparent liquid-crystal display, and two backlight colors are employed. Normally, green backlight lights but, in an emergency or a copy-disable state, orange backlight lights.

A copy-number indicator 702 indicates the number of copies or a self-diagnosis code. A selected-cassette indicator 703 indicates which of the upper stage cassette 114, the lower stage cassette 115 and the deck 201 is selected. An AE indicator 704 lights when an AE mode (automatic copy density adjustment mode) is selected through an AE key 606. A ready/wait indicator 705 utilizes a green-emitting LED and an orange-emitting LED. In a ready state (copy-enable state), the green LED lights and, in a wait state (copy-disable state), the orange LED lights. A double-sided copy indicator 706 indicates the contents selected through the double-sided copy key 608, that is, whether the production of a double-sided copy from a double-sided original or the production of a double-sided copy from a one-sided copy is selected. A power source lamp 707 lights by turning on a power switch 708.

G. CONTROL DEVICE (800)

Figure 16:
FIGS. 16, 16A and 16B is a block diagram showing the control section of the copying machine shown in FIG. 14.
Figure 16A:
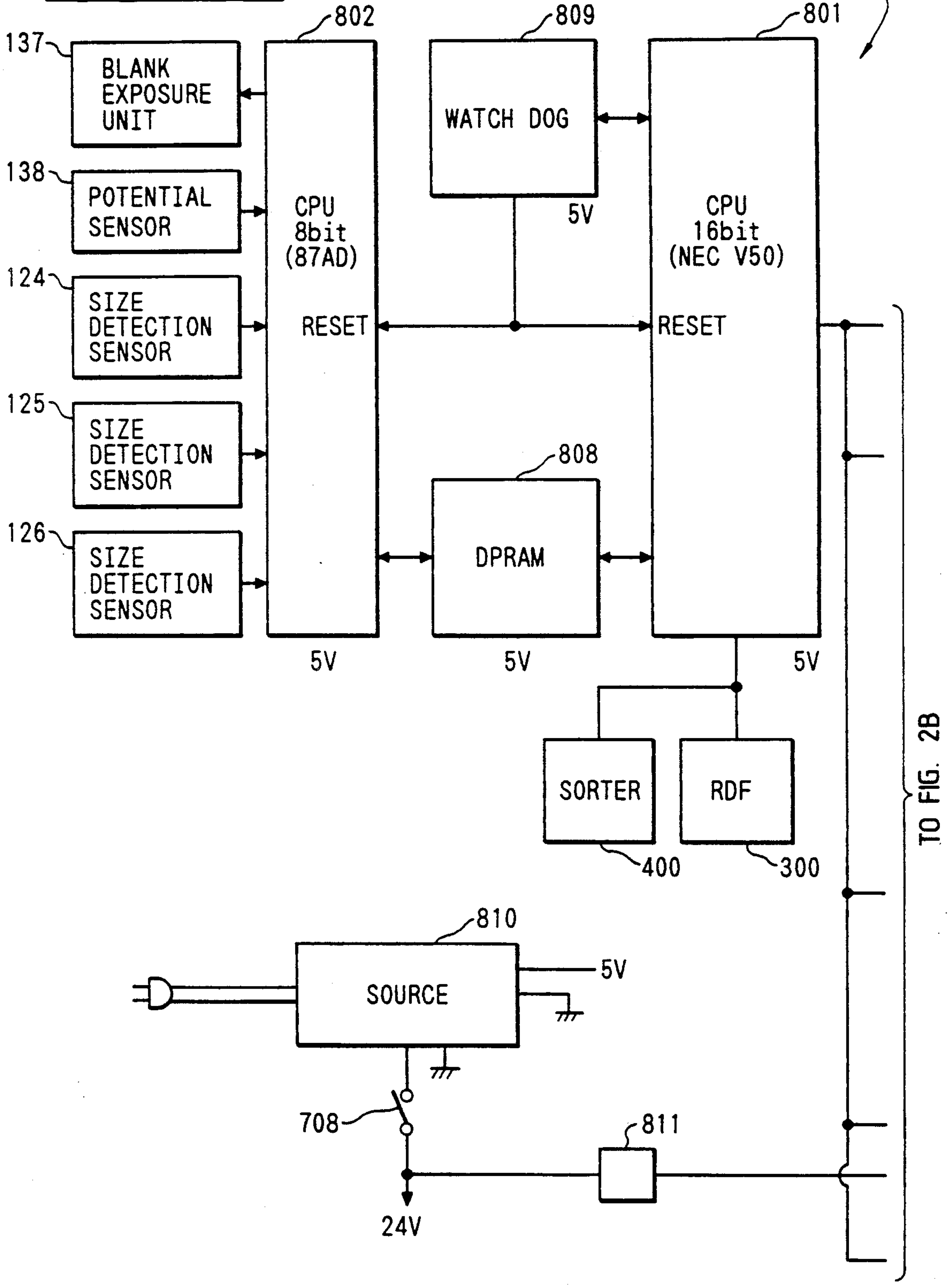
Figure 16B:
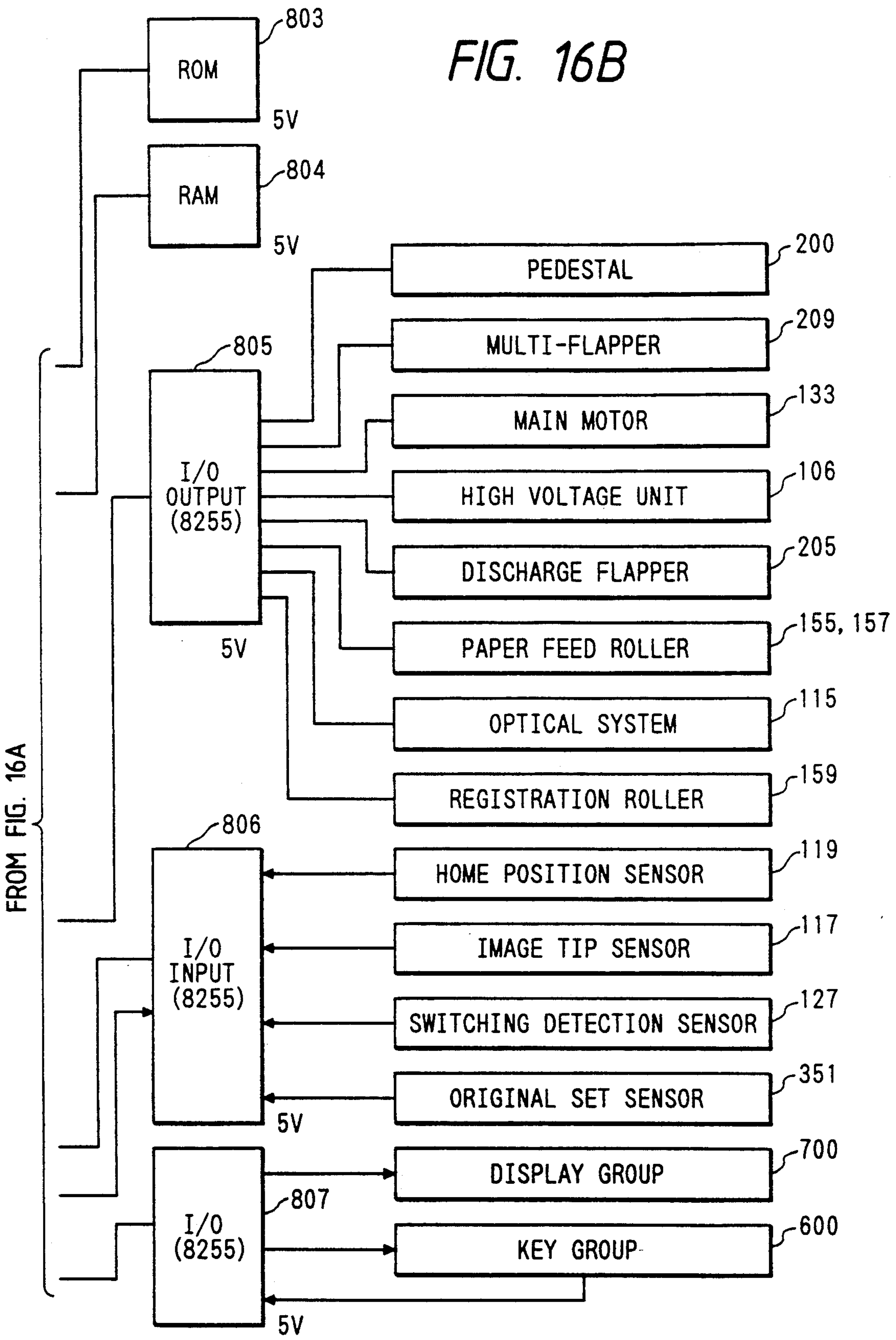

FIG. 16 is a block diagram showing a control device 800 used in the above embodiment. In the drawing, a master CPU and slave CPU are denoted by 801 and 802. A read-only memory (ROM) 803 stores the control procedure (control program) shown in FIG. 17, and the CPU 801 controls each element connected thereto via a bus in accordance with the control procedure stored in the ROM 803. A random access memory (RAM) 804 is a main storage device which is used as an input-data storing or working area.

An interface (I/0) 805 outputs control signals from the CPU 801 to each load, for example, the main motor 133. An interface 806 receives an signal from the image tip sensor 117 and transmits it to the CPU 801, and an interface 807 provides input/output control over the key group 600 and the display group 700. Each of the interfaces 805, 806 and 807 may utilize, for example, an input/output circuit port μPD8255 manufactured by NEC.

The display group 700 corresponds to the indicators shown in FIG. 15, and utilizes LEDs or LCDs. The key group 600 corresponds to the keys shown in the same drawing, and the CPU 801 can detect which key is pressed by utilizing a known key matrix.

The CPU 802 controls the blank exposure unit 137 in accordance with the blank data calculated by the CPU 801. The CPU 802 effects analog-to-digital conversion of the potential sensor 138 and the original size detecting sensors 124, 125 and 126, and transfer the digital data to the CPU 801 through a dual-port RAM 808.

A watchdog circuit 309 monitors the state of the CPU 801. If an anomalous state is detected, the watchdog circuit 309 generates reset signals for the CPUs 801 and 802.

An electrical power source is denoted by 810, and a circuit 811 converts the switching condition of the power switch 708 (power switch for turning on and off the power source 810 with respect to all the loads other than the control section) from 24 V(ON)/0 V(OFF) to 5 V/0 V. When the CPU 801 detects the opening of the power switch 708, it generates a pseudo anormality signal in accordance with the program. The CPU 801 then transmits this signal to the watchdog circuit 809 and causes it to provide a signal to the reset input of each watchdog circuit 809, thereby turning off all load driving.

The operation of the above embodiment will be explained below with reference to the flowchart of FIG. 17 and the operational sequence diagram of FIG. 20.

Figure 20:
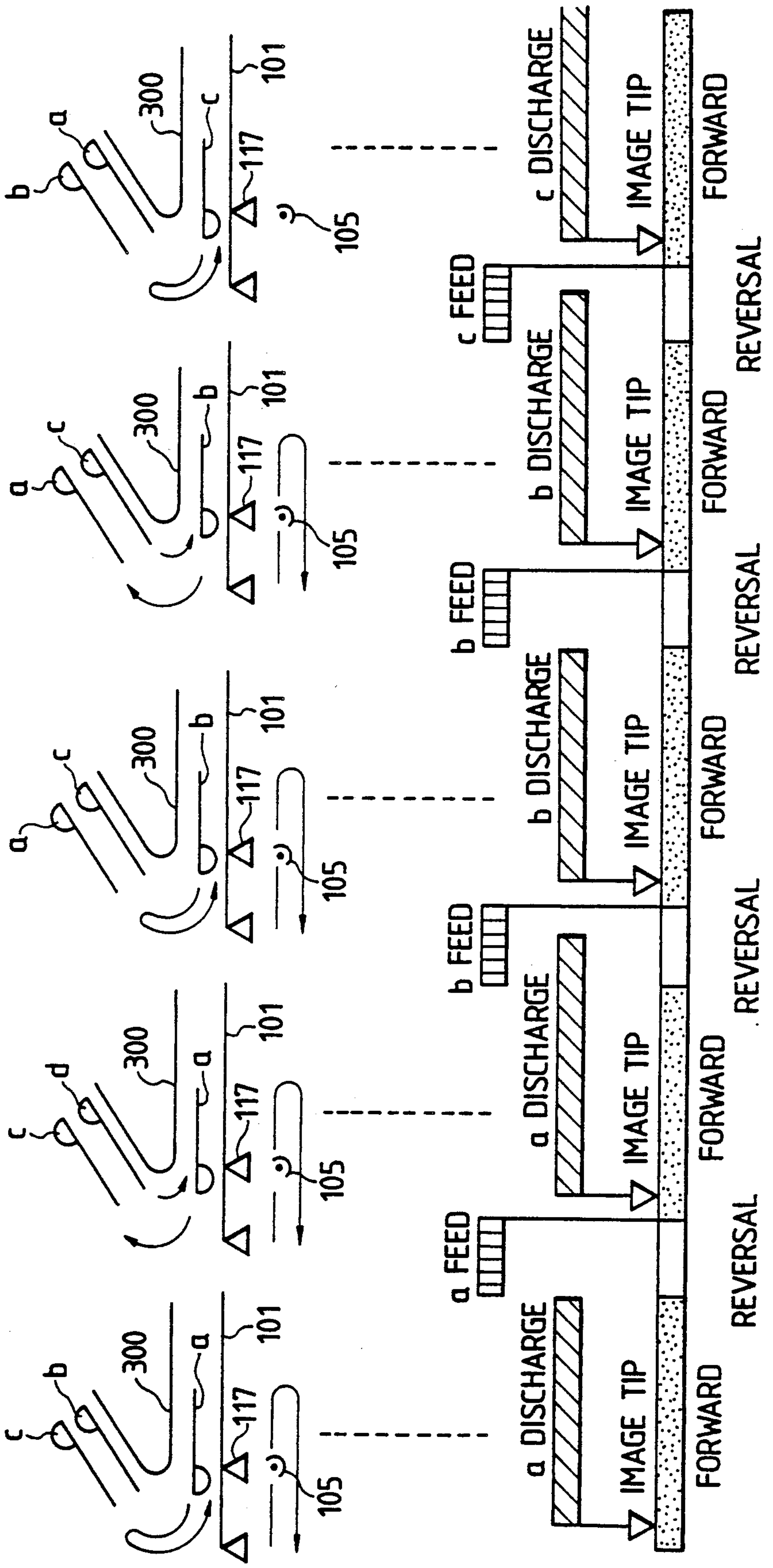
FIGS. 20 and 21 are operational sequence diagrams showing different examples of the state of original feeding.

FIG. 20 shows a multi-image formation process in which, for example, two copies are produced from each of three originals (the number of images to be formed is two for each original).

Referring to FIG. 20, the optical system 105 advances at a speed of, for example, 150 m/sec and, after the image tip sensor 117 has generated a signal, a first original a is discharged from the platen glass 101 at a speed of 150 m/sec by the motion of the flat-face belt 306. In other words, the optical system 105 and the original a are moved in mutually opposite directions in such a manner that they pass each other, whereby exposure and reading of the original a is effected (the original a is exposed and read at a relative speed of 300 m/sec). When the first cycle of exposure and reading of the original a is completed, the discharged original a is again fed to the platen glass 101 by means of the flat-face belt 306. The original is then subjected to the second cycle of exposure and reading which is similar to the first cycle.

After image formation for two sheets has been completed and the original a has been discharged, another original b (the second original) is fed to the platen glass 101 and the optical system 105 likewise advances while the original b is being discharged for exposure and reading. After image formation for two sheets has been completed and the original b has been discharged from the platen glass 101, the other original c (the third original) is fed to the platen glass 101 and similar image reading is executed.

More specifically, when the predetermined number of copies is produced, the original is discharged and, at the same time, the next original is fed. In other cases, before dynamic reading and discharging is completed (when image reading is completed), the same original is again returned to the platen glass 101.

The control procedure of the ROM 803 for effecting the above operation will be explained with reference to FIG. 17.

In Step S1000, originals are set on the stacking tray 301 of the RDF 300 and image formation is started. Then, in step S1001, the first original is fed from the RDF 300 and in Step S1002 it is determined whether or not this original has been set on the platen glass 101. Before the setting has been completed, the process proceeds to Step S1003, where the optical system 105 has been advanced.

In Step S1004, it is determined whether or not the image tip sensor 117 has generated a signal. After this signal has been generated, in Step S1005, original dynamic reading and discharging is started and a reversing timer for the optical system 105 is set. In Step S1005, the optical system 105 and the original are moved in mutually opposite directions in such a manner that they will pass each other.

In Step S1008, it is determined whether image formation for the present number of copies has been completed. If it has not yet completed, in Step S1009, the original is again fed to the platen glass 101 and the process then returns to Step S1002. If the image formation has been completed, whether or not all the originals have been copied is determined in Step S1010. If the copying has not yet been completed, in Step S1011 the next original is fed to the platen glass 101 from the RDF 300, and the process then returns to Step S1002.

When image formation for all the originals has been completed, the process ends in Step S1012.

As is apparent from the foregoing, by moving the optical system 105 and the original in mutually opposite directions in such a manner that they pass each other in each original copying operation, it is possible to remarkably improve the efficiency of image formation as compared with either a conventional arrangement in which only the optical system runs back and forth to read the original or a conventional arrangement in which, only at the time of replacement of originals, the optical system and the original are moved in mutually opposite directions in such a manner that they pass each other.

Another example of operation will be explained with reference to the operational sequence diagram of FIG. 21.

Figure 21:
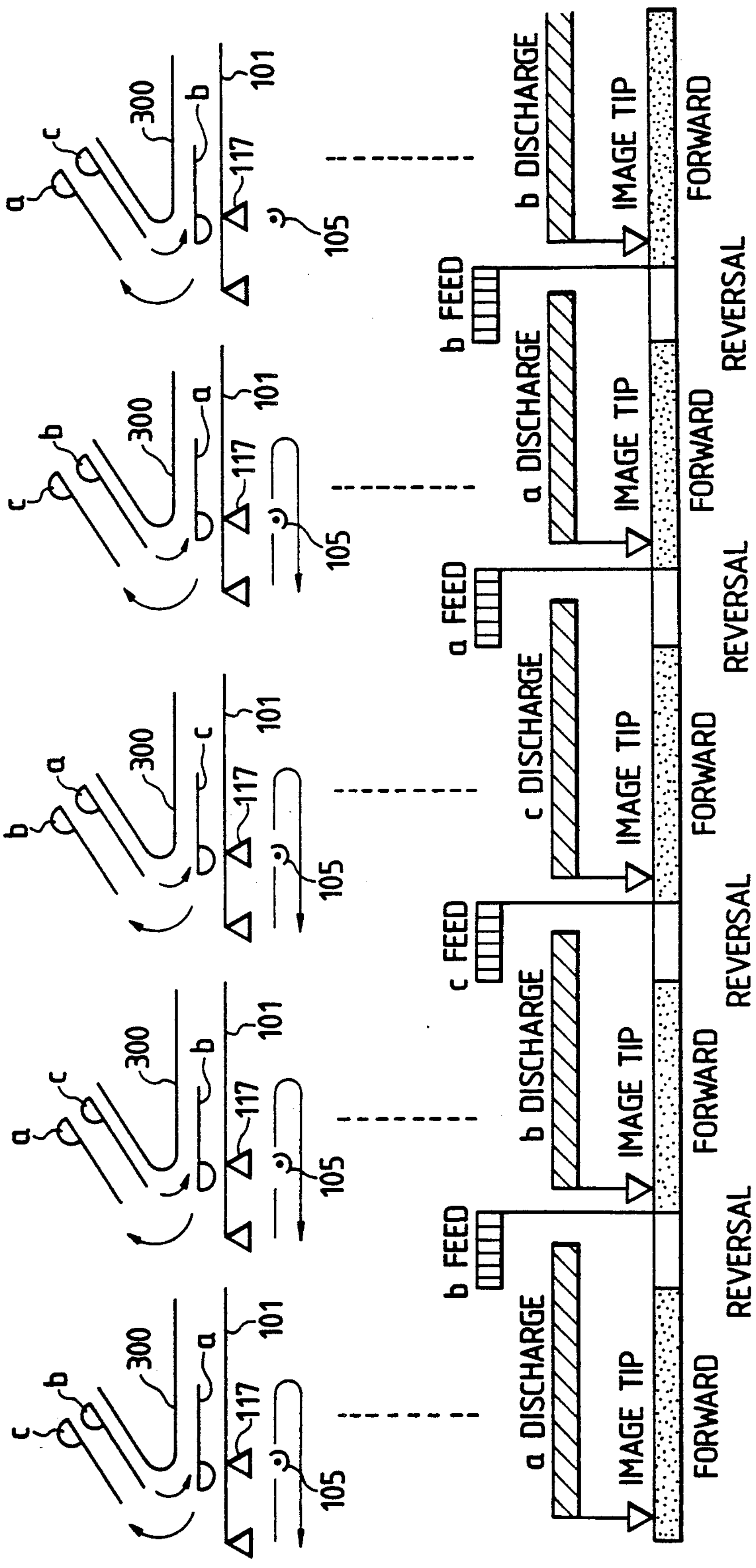

In the operational sequence shown in FIG. 21, one image forming process includes producing one copy from each of the originals a, b and c, and this image forming proces is repeated by the number of times corresponding to the set number of sheets (Each of the originals is circulated between the stacking tray 301 and the platen glass 101 by the number of times corresponding to the set number of copies.)

In operation, the optical system 105 advances at a speed of, for example, 150 m/sec. After the image tip sensor 117 has generated a signal, the first original a is discharged from the platen glass 101 at a speed of 150 m/sec by the operation of the flat-face belt 306. At this time, the optical system 105 and the original a are moved in mutually opposite direction in such a manner that they pass each other, thereby effecting exposure and reading of the original a (at a relative speed of 300 m/sec).

The discharged original a is returned to the stacking tray 301 and stacked on the original c and, at the time of the reversal of the optical system 105, the second original b is fed to the platen glass 101. Then, similarly, the optical system 105 advances and, at the same time, the original b is discharged for the purposes of exposure and reading.

The discharged original b is returned to the stacking tray 301 and stacked on the original a and, at the time of the reversal of the original system 105, the third original c is fed to the platen glass 101. Then, similarly, the optical system 105 advances and, at the same time, the original c is discharged for the purposes of exposure and reading. The discharged original c is returned to the stacking tray 301 and stacked on the original b.

In this manner, one step is completed and a similar operation is again started with the original a.

With this arrangement, it is also possible to remarkably improve the efficiency of image formation with respect to the conventional arrangements described previously.

Figures 18, 18A:
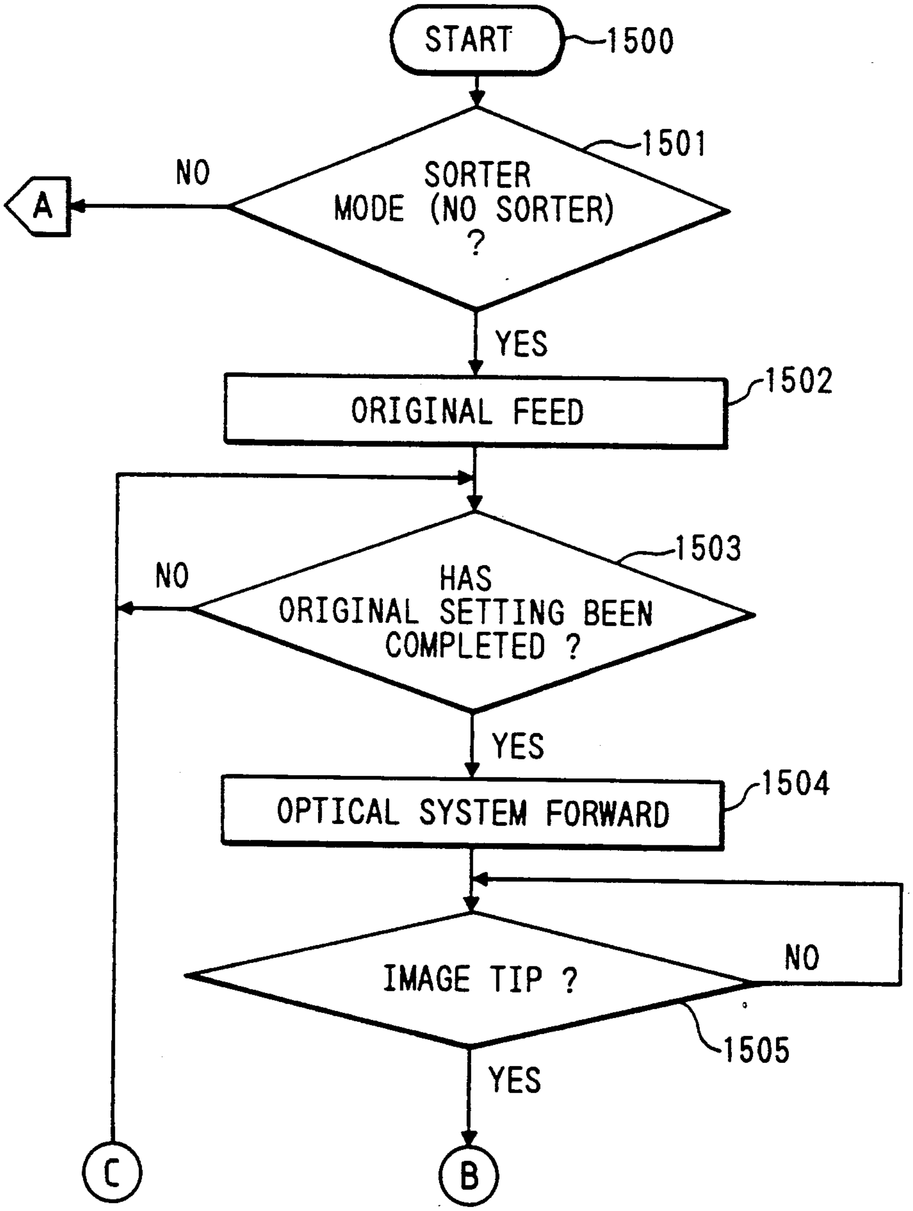
Figure 18B:
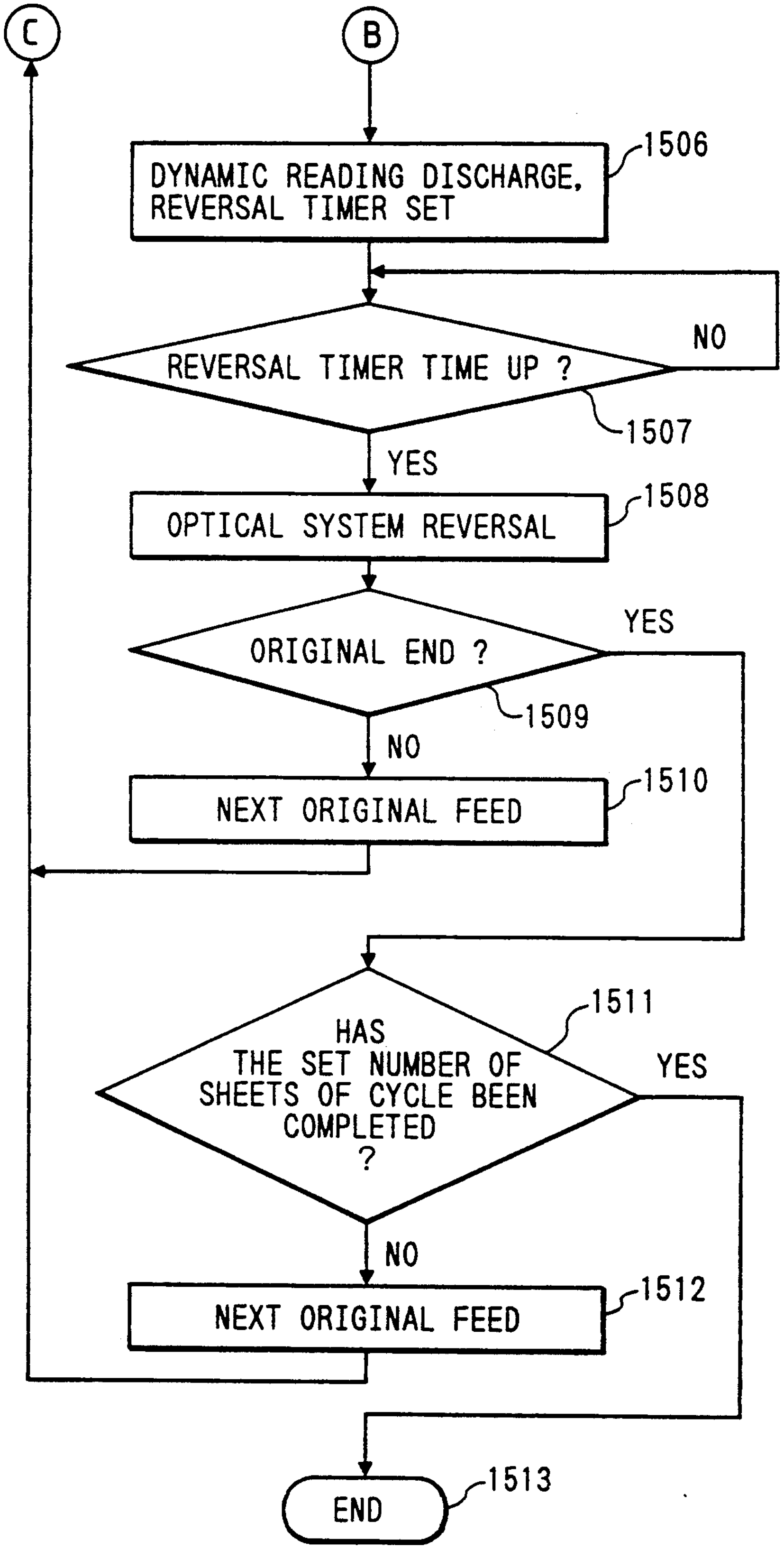

FIG. 18 is a flowchart showing the operation of effecting switching between the operational mode of FIG. 20 and the operational mode of FIG. 21 in accordance with the state of image formation.

More specifically, two kinds of mode are selectively used in accordance with the state of image formation. In the first mode, the operation of reading an image from an original while moving the optical system 105 and the original in mutually opposite directions in such a manner that they passe each other and then returning the original to the platen glass 101, is repeated by a set number of times. In the second mode, the operation of reading an image from an original while moving the optical system 105 and the original in mutually opposite directions in such a manner that they passe each other and then discharging and returning the original to the stacking tray 301, is repeated by a set number of times. Originals are successively fed onto a platen by repeating a feed operation by the set number of times, and the originals are fed while the next originals are fed after the set number of copies have been produced. In the other mode, one copy is produced in each original feeding operation and the original is replaced with the next original, and this operation is repeated by the set number of times until the set number of copies is obtained.

To perform the above selection in accordance with the state of image formation is, for example, to do that in accordance with the kind of sheet output device (or the presence or absence of a sheet output device) or the state of discharge (sorting, grouping or the like). In this case, the CPU 80 performs selection between the first mode and the second mode in response to a signal input through the selection key 610.

The contents of control for achieving the above two modes will be explained with reference to FIG. 18.

In Step S1500, originals are set on the stacking tray 301 of the RDF 300 and image formation is started. Then, in Step S1501, it is determined whether or not a sort mode has been specified through the selection key 610 with no sorter 400 connected to the main body 100.

Figure 17:
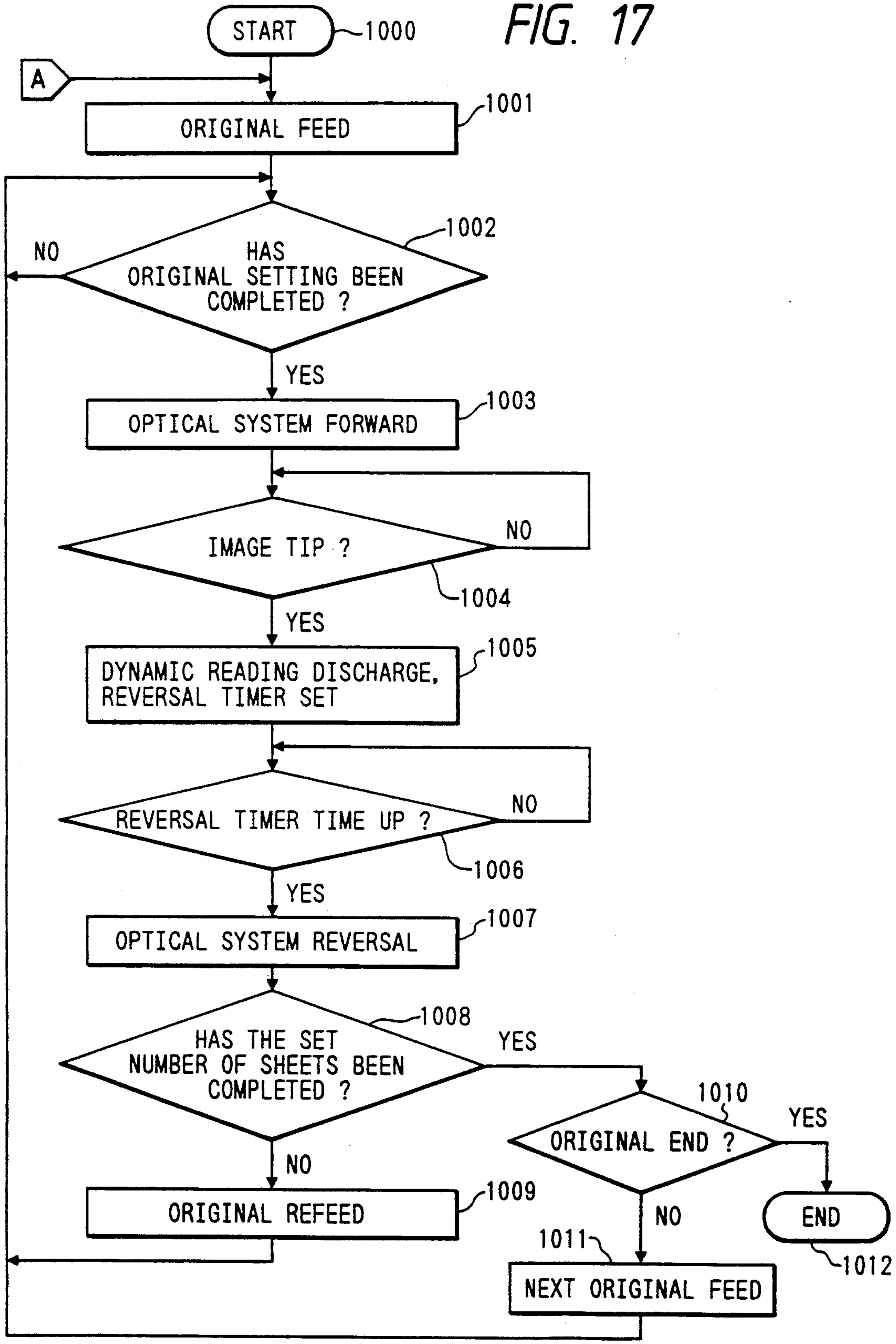
FIGS. 17, 18, 18A, 18B and 19 are control flowcharts which serve to illustrate the operation of the copying machine shown in FIG. 14.

If the answer is "NO", the first mode is selected and reading from the original is performed in the first mode (reading from the original is performed in accordance with the procedures shown in FIG. 17.) If the answer is "YES", the second mode is selected and reading from the original is performed in the second mode (reading from the original is performed in accordance with the procedures shown in FIG. 21.)

More specifically, the process proceeds to Step S1502, wherein the first original is fed to the platen glass 101. Then, in Step S1503, it is determined whether or not the original has been set on the platen glass 101. When this setting is completed, the process proceeds to Step S1504, where the optical system 105 is advanced.

Then, in Step S1505, it is determined whether or not the image tip sensor 117 has generated a signal. After the signal has been generated, in Step S1506, original dynamic reading and discharging is started and the reversing timer for the optical system 105 is set. In Step S1506, the optical system 105 and the original are moved in mutually opposite directions in such a manner that they will pass each other, thereby effecting exposure and reading of the original.

In Step S1507, it is determined whether or the reversing timer has reached the state of time-up. After the state of time-up has been reached, the process proceeds to Step S1508, where the optical system 105 is reversed. In Step S1509, it is determined whether or not reading from all the originals has been completed. If the reading has not yet been completed, the process proceeds to Step S1510, where the next original is fed to the platen glass 101. Then, the process returns to Step S1503. If reading of all the originals has been completed, the process proceeds to Step S1511, where it is determined whether or not the originals have been circulated by the number of times corresponding to the set number of copies. If this operation has not yet been completed, the process proceeds to Step S1512, where the next original is fed to the platen glass 101. Then, the process returns to Step S1503. If the operation is completed, the process ends in Step S1513.

With the above arrangement, it is possible to effect high-speed image reading in an appropriate mode corresponding to the state of image formation.

In the apparatus of the embodiment described above, it is possible for a user to perform image formation while directly pressing an original against the platen glass 101 without the use of the RDF 300. For this reason, the ROM 803 stores control having the contents shown in the flowchart of FIG. 19.

Figure 19:
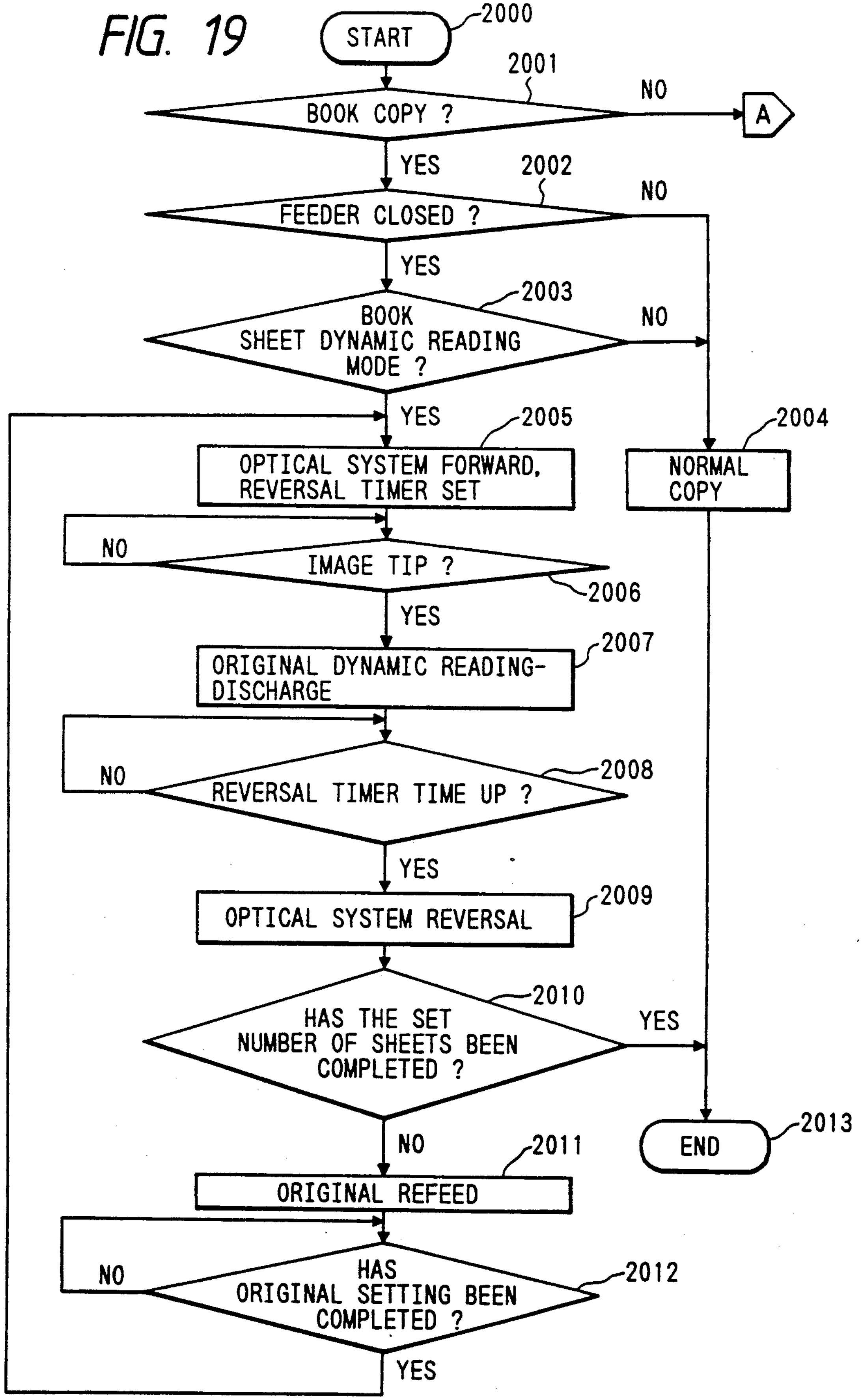

The procedure shown in the flowchart of FIG. 19 will be explained below. The flow starts in Step S200, where it is determined whether or not a feeder copy operation is selected (a book copy operation is selected). If the original sensor 351 generates a signal, that is, if an original is fed from the RDF 300, it indicates that the feeder copy original is selected. In this case, the process proceeds to Step S1001 shown in FIG. 17, and reading from the original is executed in accordance with the contents of the flowchart shown in FIG. 17 (reading from the original is performed in the first mode).

If the book copy operation is selected, the process proceeds to Step S2002, where whether or not the RDF 300 is closed through the feeder switching detecting sensor 127. If the RDF 300 is closed, it indicates that a sheet original is set and the process proceeds to Step S2003. Although not shown, a switch for selecting the execution or the non-execution of a book sheet dynamic reading mode is provided on the present apparatus. In Step S2003, it is determined whether or not the book sheet dynamic reading mode is performed. If the above switch is pressed to select the book sheet dynamic reading mode, the process proceeds to Step S2005. If no sheet original is set or a sheet dynamic reading mode is inhibited, the process proceeds to Step S2004, where only the optical system 105 reciprocally runs to effect reading from the original, thereby forming an image. The operation is completed in Step 2013.

If the sheet dynamic reading mode is executed, the process proceeds to Step S2005, where reading from the original is effected in the first mode.

In Step S1507, it is determined whether or not the optical system 105 is advanced and the reversing timer is set. Then, it is determined whether or not the image tip sensor 117 has generated a signal. If the signal is generated, the process proceeds to Step S2007, where as an original dynamic discharge is performed, reading from the original is performed. (While the optical system 105 is being advances, the original is discharged and reading from the original is performed.) Then, in Step S2008, it is determined whether or not the reversing timer has reached the state of time-up. If the state of time-up is reached, the optical system 105 is reversed in Step S2009 and in Step S2010 it is determined whether or not image formation for a set number of sheets has been completed. If the answer is "NO", the process proceeds to Step S2011, where the original is again fed to the platen glass 101. The process then proceeds to Step S2012, where it is determined whether or not the original has been set. If the original is set, the process returns to Step S2005 and a similar operation is repeated. If image formation for a set number of sheets is completed, the process ends in Step S2013.

As is apparent from the foregoing, even if a user sets an original directly on the platen glass 101, the sheet original can be identified so that it is possible to remarkably improve the efficiency of copy processing.

Although, in the above description, each embodiment is applied to an analog copying machine employing an electrophotographic process, the present invention may of course be applied to a digital copying machine, an image reader or the like.

The present invention can be applied not to one-sided recording but to double-sided recording or multiple-recording.

The above description has been made with reference to the example in which the number of copies per image is two. However, this number is not limitative and two or more copies may be produced from each image.

The image formation method is not limited to the electrophotographic process and, for example, an ink-jet method may be employed.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading apparatus comprising:

original transporting means for automatically transporting a plurality of originals one by one onto an original platen;

scanning means for effecting exposure scanning of the original while moving relative to said original which is being transported over said original platen by said original transporting means; and controlling means for controlling said scanning means so as to cause said scanning means to effect exposure scanning while moving said scanning means in a direction opposite to the direction of original feed during the transport of said original by said original transporting means.

2. An image reading apparatus according to claim 1, wherein said original transporting means has an accommodating portion for accommodating said original, said original being discharged into said accommodating portion after said original has been transported from said accommodating portion to said original platen.

3. An image reading apparatus comprising:

original transporting means for automatically transporting a plurality of originals one by one onto an original platen, said original transporting means transporting said plurality of originals at a first speed up to a position where the exposure scanning of said original is started and, during said exposure scanning, transporting said plurality of originals at a second speed slower than said first speed;

scanning means for effecting exposure scanning of the original while moving relative to said original which is being transported over said original platen by said original transporting means; and controlling means for controlling said scanning means so as to cause said scanning means to effect exposure scanning while moving said scanning means in a direction opposite to the direction of original feed during the transport of said original by said original transporting means.

4. An image reading apparatus according to claim 3, wherein said original transporting means feeds said plurality of originals to said original platen by transporting said plurality of originals in a first direction and thereafter transports said plurality of originals in a second direction opposite to said first direction.

5. An image reading apparatus comprising:

original transporting means for automatically transporting a plurality of originals one by one onto an original platen, said original transporting means feeding said plurality of originals to said original platen by transporting said plurality of originals in a first direction, and thereafter transporting said plurality of originals in a second direction opposite to said first direction;

scanning means for effecting exposure scanning of the original while moving relative to said original which is being transported over said original platen by said original transporting means; and controlling means for controlling said scanning means so as to cause said scanning means to effect exposure scanning while moving said scanning means in a direction opposite to the direction of original feed during the transport of said original by said original transporting means.

6. An image reading apparatus according to claim 5, wherein said controlling means controls said scanning means so as to effect said exposure scanning while said original is being transported in said second direction.

7. An image reading apparatus according to claim 6, comprising additional transporting means for further transporting said original transported from said original transporting means, said additional transporting means discharging said original after the completion of said exposure scanning while said original transporting means transports the next original in said first direction.

8. An image reading apparatus according to claim 6, wherein said original transporting means transports said original in said first direction to place said original at a first position on said original platen, and reaches a second position after said scanning means has started said exposure scanning, thereby transporting said original placed at said first position in said second, direction.

9. An image forming apparatus comprising:

original transporting means for automatically transporting a plurality of originals one by one onto an original platen;

image forming means including scanning means for effecting exposure scanning of the original while moving relative to said original which is being transported over said original platen by said original transporting means, said image forming means being arranged to form an image on a recording material in accordance with an original image exposure-scanned by said scanning means; and controlling means for controlling said scanning means so as to cause said scanning means to effect exposure scanning while moving said scanning means in a direction opposite to the direction of original feed during the transport of said original by said original transporting means.

10. An image forming apparatus according to claim 9, wherein said image forming means is capable of forming an image on said recording material by subjecting said original placed on said original platen to exposure scanning utilizing said scanning means.

11. An image forming apparatus according to claim 10, wherein the position where said scanning means coincides with the leading edge of said original when said scanning means is moved to effect the exposure scanning of said original which is being transported is selected to be approximately equal to the position of an image tip when said original placed on said original platen is scanned.

12. An image forming apparatus according to claim 9, wherein said image forming means is arranged to form on a rotating photosensitive member an electrostatic latent image corresponding to an original image scanned by said scanning means, develop said electrostatic latent image, and transfer said recording material.

13. An image forming apparatus according to claim 12, wherein said controlling means is further arranged to set the speed of revolution of said photosensitive member to a speed corresponding to the relative speed of said scanning means.

14. An image forming apparatus, comprising:

original transporting means for automatically transporting an original to an original platen and discharging said original from said original platen;

scanning means for effecting exposure scanning of said original while moving in a direction opposite to the direction in which said original is being moved over said original platen by said original transporting means;

image forming means for forming an image on a recording material in accordance with an original image exposure scanned by said scanning means;

setting means for setting the desired number of sheets for said image to be formed; and controlling means for controlling said original transporting means so as to repeatedly transport said original to said original platen by the number of times set by said setting means.

15. An image forming apparatus according to claim 14, wherein said scanning means is arranged to effect exposure scanning while moving in a direction opposite to the discharging direction of said original when said original is discharged from said original platen by said original transporting means.

16. An image forming apparatus according to claim 14 or 15, wherein said controlling means controls said original transporting means so that, if a plurality of sheets for one image to be formed are set by said setting means, said original transporting means discharges said original from said original platen and subsequently again transfers said original to said original platen.

17. An image forming apparatus according to claim 10, wherein said controlling means controls said original transporting means so that, in the case of a plurality of originals, said original transporting means repeats transport and discharge of one of said originals to and from said original platen by the number of times corresponding to the number of sheets set by said setting means and then transports the next original to said original platen.

18. An image forming apparatus according to claim 14 or 15, where said original feeding means transports one of said originals accommodated in an original accommodating portion to said original platen and returns an exposed original to said accommodating portion.

19. An image forming apparatus, comprising:

accommodating means for accommodating a bundle of originals;

original transporting means for effecting the original circulating operation of separately transporting each original from said bundle of originals accommodated in said accommodating means to an original platen, then discharging said original from said original platen, and then returning said original to said accommodating means;

scanning means for effecting exposure scanning of said original while moving in a direction opposite to the direction in which said said original is being moved over said original platen by same original transporting means;

image forming means for forming on a recording medium an image corresponding to an original image exposure scanned by said scanning means;

setting means for setting a desired number of sheets for one image to be formed; and controlling means for controlling said original transporting means to cause it to repeat said original circulating operation for all the originals accommodated in said accommodating means by the number of times set by said setting means.

20. An image forming apparatus, according to claim 19, wherein said scanning means is arranged to effect exposure scanning while moving in a direction opposite to the discharging direction of said original when said original is discharged from said original platen by said original transporting means.

21. An image forming apparatus according to claim 19 or 20, wherein said controlling means controls said original transporting means to cause it to start transporting the next original to said original platen before an exposed original is returned to said accommodating means.

22. An image forming apparatus comprising:

original transporting means for automatically transporting an original;

scanning means for effecting exposure scanning of said original by moving relative to said original which is being transported over said original platen by said original transporting means; and controlling means for controlling said scanning means to cause it to effect exposure scanning of said original while moving in a direction opposite to the direction in which said original is being transported by said original transporting means and then to reverse said scanning means at a predetermined timing, said controlling means varying said predetermined timing.

23. An image forming apparatus according to claim 22, wherein said controlling means varies said predetermined timing in accordance with each original size.

24. An image forming apparatus according to claim 23, wherein said controlling means determines said predetermined timing in accordance with said original size, the speed of said original transported by said original transporting means, and the scanning speed of said scanning means.

25. An image forming apparatus comprising:

original transporting means for automatically transporting an original;

scanning means for effecting exposure scanning of said original while moving relative to said original which is being transported over an original platen by said original transporting means;

image forming means for forming on a recording medium an image corresponding to an original image which is exposed and scanned by said scanning means;

setting means for setting a magnification for image formation effected by said image forming means; and controlling means for controlling said scanning means to cause it to effect exposure scanning of said original while moving in a direction opposite to the direction in which said original is being transported by said original transporting means and then to reverse said scanning means at a predetermined reversing timing, said controlling means varying said reversing timing.

26. An image forming apparatus according to claim 25, wherein said controlling means varies said reversing timing in accordance with the size of said recording medium.

27. An image forming apparatus according to claim 26, wherein said controlling means varies said reversing timing in accordance with the size of said recording medium and said magnification for image formation effected by said image forming means.

28. An image forming apparatus comprising:

original transporting means for automatically transporting an original;

scanning means for effecting exposure scanning of said original while moving relative to said original which is being transported over an original platen by said original transporting means;

image forming means for forming on a recording medium an image corresponding to an original image which is exposed and scanned by said scanning means;

setting means for setting a magnification for image formation effected by said image forming means; and controlling means for controlling said scanning means to cause it to effect exposure scanning of said original while moving in a direction opposite to the direction in which said original is being transported by said original transporting means and then to reverse said scanning means at a predetermined reversing timing, said controlling means having a plurality of modes for determining said reversing timing.

29. An image forming apparatus according to claim 28, wherein said controlling means reverses said scanning means at a reversing timing determined by one of said plurality of modes.

30. An image forming apparatus according to claim 28 or 29, wherein said controlling means selects, as an actual reversing timing, a reversing timing corresponding to a shorter distance traveled by said scanning means between the reversing timings determined by said plurality of modes.

31. An image forming apparatus according to claim 28 or 29, wherein said plurality of modes includes a first mode for determining said reversing timing in accordance with an original size.

32. An image forming apparatus according to claim 31, wherein said controlling means determines said reversing timing in accordance with said original size, the speed of said original transported by said original transporting means, and the scanning speed of said scanning means.

33. An image forming apparatus according to claim 28 or 29, wherein said plurality of modes includes a second mode for determining said reversing timing in accordance with the size of said recording medium.

34. An image forming apparatus according to claim 33, wherein said controlling means varies said reversing timing in accordance with the size of said recording medium and said magnification for image formation effected by said image forming means.

35. An image scanning apparatus comprising:

transporting means for automatically transporting an original;

scanning means for exposing and scanning the original;

control means having a first mode for moving said scanning means to scan the original being stationary on an original platen, without causing said transporting means to operate, and having a second mode for causing said transporting means to operate to transport the original and moving said scanning means in the direction opposite to a transporting direction of said original to scan the original being transported on an original platen.

36. An image scanning apparatus according to claim 35, wherein said transporting means includes detection means for detecting whether there is the original to be transported and said control means selects said second mode when said detection means detects that there is the original.

* * * * *

UNITED STATES PATENT AND TRADEMARK OFFICE
CERTIFICATE OF CORRECTION

PATENT NO. : 5,105,225

DATED : April 14, 1992

INVENTOR(S) : Takeshi Honjo, et al.

It is certified that error appears in the above-identified patent and that said Letters Patent is hereby corrected as shown below:

On the Title Page, please add:

[30] Foreign Application Priority Data

Feb. 17, 1989 [JP] Japan ....... 1-37416
April 24, 1989 [JP] Japan ....... 1-101616
April 24, 1989 [JP] Japan ....... 1-101617

Column 3 line 51, "is" should read --are--.

Column 4 line 12, "is" should read --are--.

line 59, "rollers 115" should read --rollers 155--.

Column 6 line 51, "stored" should read --stores--.

Column 7 line 61, delete "In"; and line 62, delete "addition, the first clutch 361 (refer to Fig. 2).".

Column 8 line 14, "single-oridinal-copy" should read --single-original-copy--.

UNITED STATES PATENT AND TRADEMARK OFFICE

CERTIFICATE OF CORRECTION

PATENT NO. : 5,105,225

DATED : April 14, 1992

INVENTOR(S) : Takeshi Honjo, et al.

It is certified that error appears in the above-identified patent and that said Letters Patent is hereby corrected as shown below:

<u>Column 10</u> line 11, "12/SB≤13/SM," should read --12/SB< 13/SM,--.

<u>Column 11</u> line 22, "(L1=L2)" should --(L1-L2)--.

<u>Column 13</u> line 26, "returns" should read --returns to--;

line 38, "(M>)" should read --(M5)--; and line 51, "revering" should --reversing--.

<u>Column 14</u> line 3m "returns" should read --returns to--.

<u>Column 20</u> line 40, "proces" should read --process--; and line 41, "sheets" should read --sheets.--.

<u>Column 21</u> line 18, "passe" should read --pass--; and line 23, "passe" should read --pass--.

UNITED STATES PATENT AND TRADEMARK OFFICE

CERTIFICATE OF CORRECTION

PATENT NO. : 5,105,225

DATED : April 14, 1992

INVENTOR(S) : Takeshi Honjo, et al.

It is certified that error appears in the above-identified patent and that said Letters Patent is hereby corrected as shown below:

Column 23 line 1, "advances" should read --advanced--.

Column 24 line 61, "second," should read --second--.

Column 25 line 68, "10," should read --16,--.

Column 26 line 9, "where" should read --wherein--;
line 25, delete "said" (second occurrence); and
line 26, "same" should read --said--.

Signed and Sealed this

Twelfth Day of October, 1993

Attest:

BRUCE LEHMAN

Attesting Officer

*Commissioner of Patents and Trademarks*